US009170893B2

(12) United States Patent
Okubo et al.

(10) Patent No.: US 9,170,893 B2
(45) Date of Patent: Oct. 27, 2015

(54) METHOD AND SYSTEM FOR SELECTING REGION OF A NONVOLATILE MEMORY

(71) Applicant: Sony Corporation, Tokyo (JP)

(72) Inventors: Hideaki Okubo, Saitama (JP); Keiichi Tsutsui, Kanagawa (JP); Kenichi Nakanishi, Tokyo (JP); Yasushi Fujinami, Tokyo (JP); Naohiro Adachi, Tokyo (JP); Ken Ishii, Tokyo (JP); Tatsuo Shinbashi, Tokyo (JP)

(73) Assignee: Sony Corporation, Tokyo (JP)

( * ) Notice: Subject to any disclaimer, the term of this patent is extended or adjusted under 35 U.S.C. 154(b) by 139 days.

(21) Appl. No.: 13/827,926

(22) Filed: Mar. 14, 2013

(65) Prior Publication Data

US 2013/0275818 A1 Oct. 17, 2013

(30) Foreign Application Priority Data

Apr. 17, 2012 (JP) ................... 2012-093521

(51) Int. Cl.
G06F 11/00 (2006.01)
G06F 11/16 (2006.01)
G06F 11/10 (2006.01)

(52) U.S. Cl.
CPC .......... *G06F 11/167* (2013.01); *G06F 11/1048* (2013.01)

(58) Field of Classification Search
CPC ............ G06F 11/1048; G06F 12/0246; G06F 11/0754; G06F 11/076; G06F 11/167; G11B 20/1883; G11B 2220/61; G11B 2020/1869
USPC ............... 714/6.11, 6.13, 47.2, 710; 711/154, 711/158, 170
See application file for complete search history.

(56) References Cited

U.S. PATENT DOCUMENTS

| 5,559,956 | A  | * | 9/1996  | Sukegawa ............... 714/6.13 |
| 6,038,679 | A  | * | 3/2000  | Hanson .................. 714/5.1 |
| 6,584,015 | B2 | * | 6/2003  | Katayama et al. ....... 365/185.11 |
| 6,646,969 | B2 | * | 11/2003 | Takahashi ............... 369/53.36 |
| 6,654,901 | B1 | * | 11/2003 | Nakai et al. ............ 714/1 |
| 6,742,137 | B1 | * | 5/2004  | Frey, Jr. ................. 714/6.22 |
| 7,082,494 | B1 | * | 7/2006  | Thelin et al. ........... 711/112 |
| 7,325,157 | B2 | * | 1/2008  | Sesek et al. ............ 714/6.13 |
| 7,447,936 | B2 | * | 11/2008 | Shiota et al. ........... 714/6.1 |
| 7,536,625 | B2 | * | 5/2009  | Seng et al. ............. 714/755 |
| 8,223,547 | B2 | * | 7/2012  | Conley et al. ........... 365/185.11 |
| 8,223,554 | B2 | * | 7/2012  | Hemink ................. 365/185.21 |
| 8,451,662 | B2 | * | 5/2013  | Visconti et al. .......... 365/185.22 |
| 2007/0101189 | A1 | * | 5/2007  | Shinbori et al. ......... 714/8 |

(Continued)

FOREIGN PATENT DOCUMENTS

| JP | 06-131884  | 5/1994 |
| JP | 10-222995  | 8/1998 |
| JP | 2002-048783 | 2/2002 |

*Primary Examiner* — Marc Duncan
(74) *Attorney, Agent, or Firm* — Sony Corporation

(57) ABSTRACT

Disclosed herein is a storage controlling apparatus, including: a status acquisition section configured to acquire status including a number of times of execution of verification after writing into a memory from the memory; a history information retention section configured to retain a history of the status as history information in an associated relationship with each of predetermined regions of the memory; and a region selection section configured to select a region which satisfies a condition in accordance with the history information when a new region is to be used in the memory.

16 Claims, 21 Drawing Sheets

(56) References Cited

U.S. PATENT DOCUMENTS

2009/0182933 A1* 7/2009 Jang et al. ............... 711/103
2010/0082884 A1* 4/2010 Chen et al. ............... 711/103
2010/0135082 A1* 6/2010 Bathul et al. ............ 365/185.19
2011/0275186 A1* 11/2011 Ito et al. ................... 438/257
2012/0117304 A1* 5/2012 Worthington et al. ....... 711/103
2012/0239991 A1* 9/2012 Melik-Martirosian ....... 714/708

* cited by examiner

F I G . 1
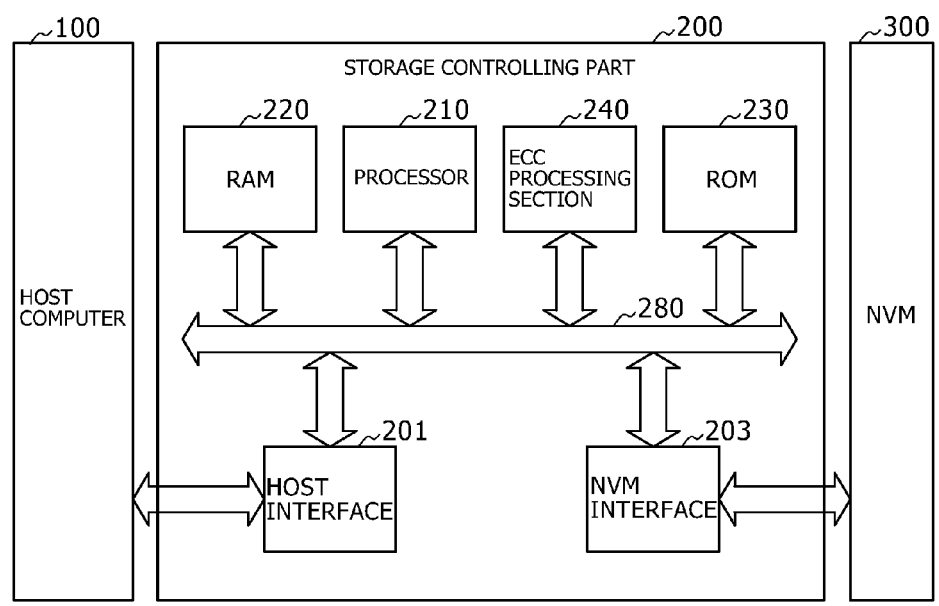

F I G . 2
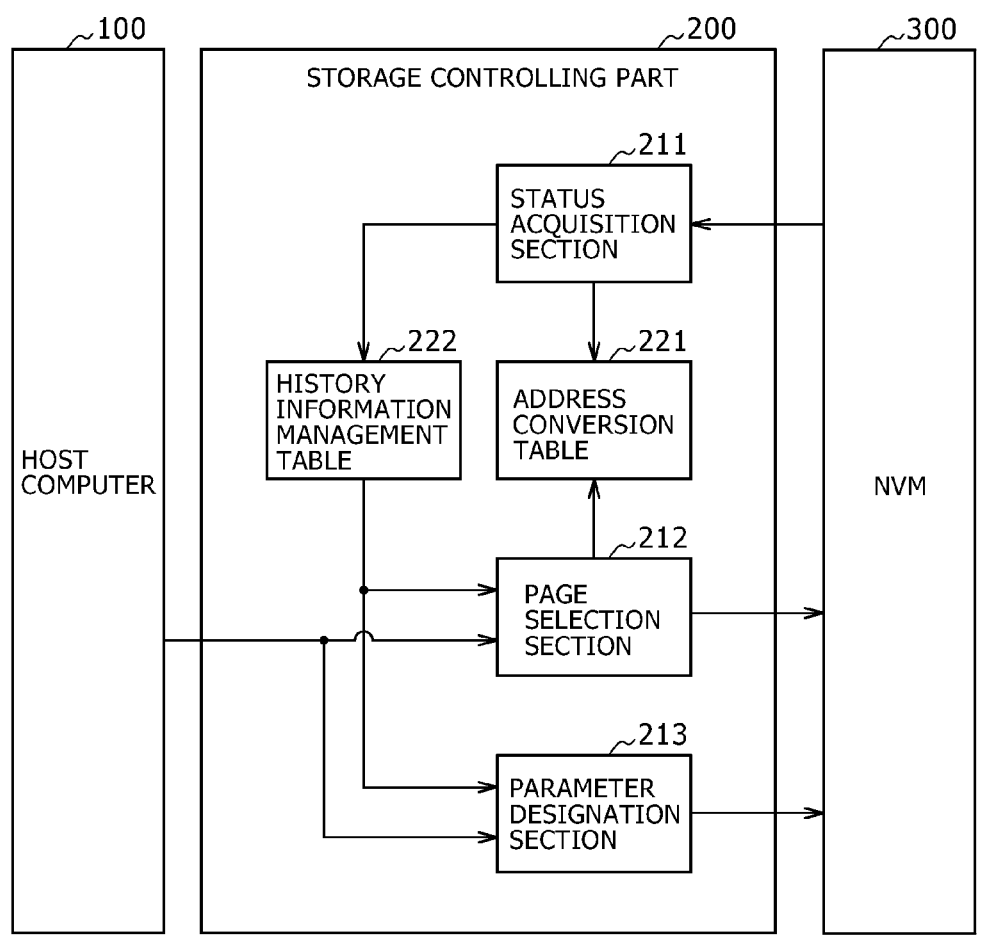

| DATA | ECC |

|←—— 512 BYTES (4096 BITS) ——→|← 52 BITS →|

| LOGICAL ADDRESS | DATA FLAG | PHYSICAL PAGE ADDRESS |
|---|---|---|
| 0x00000000 | True | $a_0$ |
| 0x00000001 | False | - |
| ⋮ | ⋮ | ⋮ |
| i | True | $a_i$ |
| ⋮ | ⋮ | ⋮ |
| n | True | $a_n$ |

FIG.6

| PHYSICAL PAGE ADDRESS | STATE | PROGRAM | | | | | | ERASURE | | | | | |
|---|---|---|---|---|---|---|---|---|---|---|---|---|---|
| | | DETECTION ERROR NUMBER | | | VERIFICATION EXECUTION TIME NUMBER | | | DETECTION ERROR NUMBER | | | VERIFICATION EXECUTION TIME NUMBER | | |
| | | ONE CYCLE BEFORE | TWO CYCLES BEFORE | THREE CYCLES BEFORE | ONE CYCLE BEFORE | TWO CYCLES BEFORE | THREE CYCLES BEFORE | ONE CYCLE BEFORE | TWO CYCLES BEFORE | THREE CYCLES BEFORE | ONE CYCLE BEFORE | TWO CYCLES BEFORE | THREE CYCLES BEFORE |
| 0x00000000 | USED | 1 | 0 | 0 | 1 | 2 | 1 | 1 | 0 | 0 | 1 | 2 | 1 |
| ⋮ | ⋮ | ⋮ | ⋮ | ⋮ | ⋮ | ⋮ | ⋮ | ⋮ | ⋮ | ⋮ | ⋮ | ⋮ | ⋮ |
| k | USED | 0 | 0 | 0 | 1 | 1 | 3 | 0 | 0 | 0 | 1 | 1 | 1 |
| k+1 | BLANK | 1 | 1 | 2 | 1 | 1 | 1 | 0 | 0 | 0 | 1 | 1 | 1 |
| k+2 | BLANK | 0 | 0 | 1 | 2 | 1 | 1 | 0 | 0 | 0 | 1 | 1 | 1 |
| k+3 | BLANK | 3 | 3 | 3 | 4 | 4 | 4 | 4 | 3 | 3 | 4 | 4 | 4 |
| ⋮ | ⋮ | ⋮ | ⋮ | ⋮ | ⋮ | ⋮ | ⋮ | ⋮ | ⋮ | ⋮ | ⋮ | ⋮ | ⋮ |

FIG.14

| LOGICAL ADDRESS | DATA FLAG | FIRST PHYSICAL PAGE ADDRESS | SECOND PHYSICAL PAGE ADDRESS |
|---|---|---|---|
| 0x00000000 | True | $a_0$ | $b_0$ |
| 0x00000001 | False | - | - |
| ⋮ | ⋮ | ⋮ | ⋮ |
| i | True | $a_i$ | $b_i$ |
| ⋮ | ⋮ | ⋮ | ⋮ |
| n | True | $a_n$ | $b_n$ |

FIG.15

| FIRST PHYSICAL PAGE ADDRESS | STATE | PROGRAM | | | | | | ERASURE | | | | | |
|---|---|---|---|---|---|---|---|---|---|---|---|---|---|
| | | DETECTION ERROR NUMBER | | | VERIFICATION EXECUTION TIME NUMBER | | | DETECTION ERROR NUMBER | | | VERIFICATION EXECUTION TIME NUMBER | | |
| | | ONE CYCLE BEFORE | TWO CYCLES BEFORE | THREE CYCLES BEFORE | ONE CYCLE BEFORE | TWO CYCLES BEFORE | THREE CYCLES BEFORE | ONE CYCLE BEFORE | TWO CYCLES BEFORE | THREE CYCLES BEFORE | ONE CYCLE BEFORE | TWO CYCLES BEFORE | THREE CYCLES BEFORE |
| 0x00000000 | USED | 1 | 0 | 0 | 1 | 2 | 1 | 1 | 0 | 0 | 1 | 2 | 1 |
| ⋮ | ⋮ | ⋮ | ⋮ | ⋮ | ⋮ | ⋮ | ⋮ | ⋮ | ⋮ | ⋮ | ⋮ | ⋮ | ⋮ |
| k | USED | 0 | 0 | 0 | 1 | 1 | 3 | 0 | 0 | 0 | 1 | 1 | 1 |
| k+1 | BLANK | 1 | 1 | 2 | 1 | 1 | 1 | 0 | 0 | 0 | 1 | 1 | 1 |
| k+2 | BLANK | 0 | 0 | 1 | 2 | 1 | 1 | 0 | 0 | 0 | 1 | 1 | 1 |
| k+3 | BLANK | 3 | 3 | 3 | 4 | 4 | 4 | 4 | 3 | 3 | 4 | 4 | 4 |
| ⋮ | ⋮ | ⋮ | ⋮ | ⋮ | ⋮ | ⋮ | ⋮ | ⋮ | ⋮ | ⋮ | ⋮ | ⋮ | ⋮ |

FIG.16

| SECOND PHYSICAL PAGE ADDRESS | STATE | PROGRAM | | | | | | ERASURE | | | | | |
|---|---|---|---|---|---|---|---|---|---|---|---|---|---|
| | | DETECTION ERROR NUMBER | | | VERIFICATION EXECUTION TIME NUMBER | | | DETECTION ERROR NUMBER | | | VERIFICATION EXECUTION TIME NUMBER | | |
| | | ONE CYCLE BEFORE | TWO CYCLES BEFORE | THREE CYCLES BEFORE | ONE CYCLE BEFORE | TWO CYCLES BEFORE | THREE CYCLES BEFORE | ONE CYCLE BEFORE | TWO CYCLES BEFORE | THREE CYCLES BEFORE | ONE CYCLE BEFORE | TWO CYCLES BEFORE | THREE CYCLES BEFORE |
| 0x00000000 | USED | 0 | 1 | 1 | 2 | 1 | 2 | 0 | 0 | 0 | 1 | 2 | 1 |
| ⋮ | ⋮ | ⋮ | ⋮ | ⋮ | ⋮ | ⋮ | ⋮ | ⋮ | ⋮ | ⋮ | ⋮ | ⋮ | ⋮ |
| j | BLANK | 1 | 1 | 1 | 1 | 1 | 1 | 0 | 0 | 0 | 1 | 1 | 1 |
| j+1 | NOT ERASED | 2 | 1 | 1 | 2 | 1 | 1 | 0 | 0 | 0 | 1 | 2 | 1 |
| j+2 | BLANK | 0 | 0 | 0 | 2 | 2 | 1 | 0 | 0 | 0 | 1 | 1 | 1 |
| j+3 | BLANK | 4 | 3 | 3 | 4 | 4 | 4 | 4 | 3 | 3 | 4 | 4 | 4 |
| ⋮ | ⋮ | ⋮ | ⋮ | ⋮ | ⋮ | ⋮ | ⋮ | ⋮ | ⋮ | ⋮ | ⋮ | ⋮ | ⋮ |

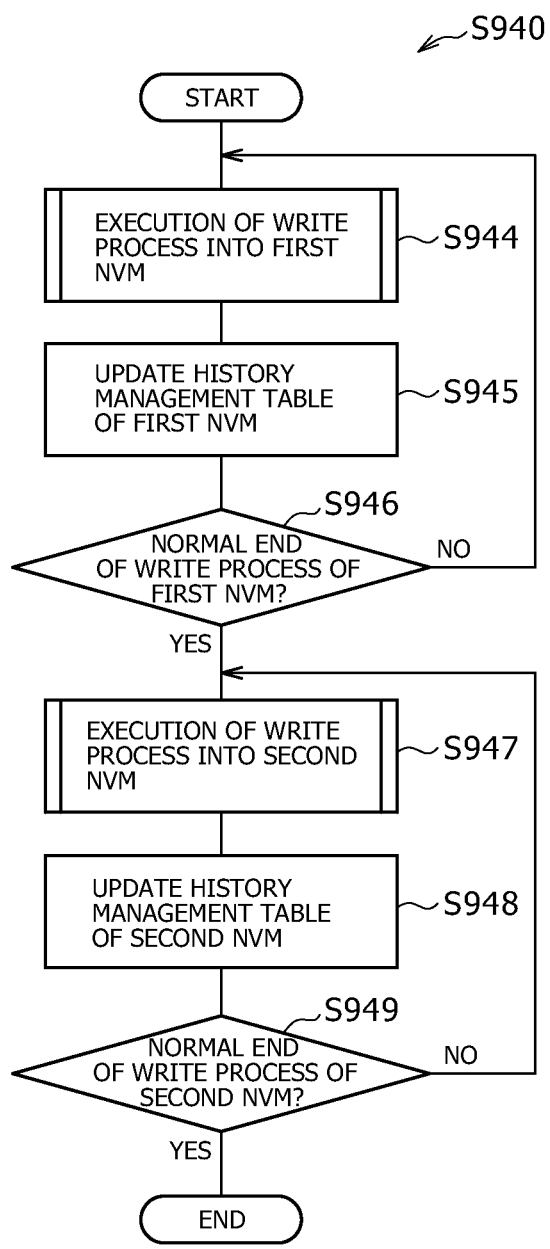

FIG.19

| FIRST PHYSICAL PAGE ADDRESS | STATE | PROGRAM | | | | | | ERASURE | | | | | |
|---|---|---|---|---|---|---|---|---|---|---|---|---|---|
| | | VERIFICATION EXECUTION TIME NUMBER | | | START LEVEL | | | VERIFICATION EXECUTION TIME NUMBER | | | START LEVEL | | |
| | | ONE CYCLE BEFORE | TWO CYCLES BEFORE | THREE CYCLES BEFORE | ONE CYCLE BEFORE | TWO CYCLES BEFORE | THREE CYCLES BEFORE | ONE CYCLE BEFORE | TWO CYCLES BEFORE | THREE CYCLES BEFORE | ONE CYCLE BEFORE | TWO CYCLES BEFORE | THREE CYCLES BEFORE |
| 0x00000000 | USED | 1 | 2 | 1 | 1 | 1 | 1 | 1 | 2 | 1 | 1 | 1 | 1 |
| ⋮ | ⋮ | ⋮ | ⋮ | ⋮ | ⋮ | ⋮ | ⋮ | ⋮ | ⋮ | ⋮ | ⋮ | ⋮ | ⋮ |
| k | USED | 1 | 2 | 3 | 2 | 2 | 2 | 1 | 1 | 1 | 2 | 2 | 2 |
| k+1 | BLANK | 1 | 1 | 2 | 2 | 2 | 1 | 1 | 1 | 1 | 1 | 1 | 1 |
| k+2 | BLANK | 2 | 1 | 1 | 1 | 1 | 1 | 1 | 1 | 1 | 1 | 1 | 1 |
| k+3 | BLANK | 3 | 2 | 2 | 2 | 3 | 3 | 2 | 2 | 3 | 3 | 3 | 2 |
| ⋮ | ⋮ | ⋮ | ⋮ | ⋮ | ⋮ | ⋮ | ⋮ | ⋮ | ⋮ | ⋮ | ⋮ | ⋮ | ⋮ |

FIG.20

| SECOND PHYSICAL PAGE ADDRESS | STATE | PROGRAM | | | | | | ERASURE | | | | | |
|---|---|---|---|---|---|---|---|---|---|---|---|---|---|
| | | VERIFICATION EXECUTION TIME NUMBER | | | START LEVEL | | | VERIFICATION EXECUTION TIME NUMBER | | | START LEVEL | | |
| | | ONE CYCLE BEFORE | TWO CYCLES BEFORE | THREE CYCLES BEFORE | ONE CYCLE BEFORE | TWO CYCLES BEFORE | THREE CYCLES BEFORE | ONE CYCLE BEFORE | TWO CYCLES BEFORE | THREE CYCLES BEFORE | ONE CYCLE BEFORE | TWO CYCLES BEFORE | THREE CYCLES BEFORE |
| 0x00000000 | USED | 2 | 1 | 2 | 1 | 1 | 1 | 1 | 2 | 1 | 1 | 1 | 1 |
| ⋮ | ⋮ | ⋮ | ⋮ | ⋮ | ⋮ | ⋮ | ⋮ | ⋮ | ⋮ | ⋮ | ⋮ | ⋮ | ⋮ |
| j | BLANK | 1 | 1 | 1 | 2 | 2 | 2 | 1 | 1 | 1 | 2 | 2 | 1 |
| j+1 | NOT ERASED | 2 | 1 | 1 | 1 | 1 | 1 | 1 | 2 | 1 | 1 | 1 | 1 |
| j+2 | BLANK | 2 | 2 | 1 | 1 | 1 | 1 | 1 | 1 | 1 | 1 | 1 | 1 |
| j+3 | BLANK | 1 | 2 | 1 | 4 | 3 | 4 | 1 | 1 | 1 | 4 | 4 | 4 |
| ⋮ | ⋮ | ⋮ | ⋮ | ⋮ | ⋮ | ⋮ | ⋮ | ⋮ | ⋮ | ⋮ | ⋮ | ⋮ | ⋮ |

METHOD AND SYSTEM FOR SELECTING REGION OF A NONVOLATILE MEMORY

BACKGROUND

The present technology relates to a storage controlling apparatus. More particularly, the present technology relates to a storage controlling apparatus, a storage apparatus and an information processing system for a nonvolatile memory and a processing method for the storage controlling apparatus, storage apparatus and information processing system as well as a program for causing a computer to execute the processing method.

In a semiconductor memory such as a NAND flash memory or a ReRAM (Resistance RAM), writing and erasure are carried out collectively into and from memory cells connected to a selected word line. Upon writing or erasure of data, a method of carrying out verify reading out after a writing operation or an erasure operation into or from the memory cells is used in order to ensure the reliability of data. If a writing operation into or an erasure operation from memory cells and verify reading out are executed only once, then the writing operation or the erasure operation does not sometimes end correctly by an influence of a dispersion arising from a fabrication process. In this instance, a writing operation or an erasure operation and verify reading out are executed repetitively by a plural number of times.

On the other hand, in order to correctly record or read out data into or from a NAND flash memory or a ReRAM, the internal circuit of a memory chip or a memory controller has an error correction function. Also a method of utilizing the error correction function such that appearance of some errors is permitted to decrease the number of times of repetition to speed up writing or erasure of data has been proposed. Such a method as just described is disclosed, for example, in Japanese Patent Laid-Open No. Hei 06-131884, Japanese Patent Laid-Open No. 2002-048783 or Japanese Patent Laid-Open No. Hei 10-222995.

SUMMARY

In the method described above, an error correction function is assumed to permit appearance of some errors to achieve speeding up of writing or erasure of data. However, according to the method, the degree of repetitions of a writing operation or an erasure operation and verify reading out cannot be predicted, and a nature of memory cells cannot be grasped. Therefore, the region to be used of the memory cannot be selected in accordance with a performance required for the memory.

Therefore, it is desirable to make it possible to select a region to be used of a memory in accordance with a performance required for a memory.

According to a first embodiment of the present technology, there is provided a storage controlling apparatus including a status acquisition section configured to acquire status including a number of times of execution of verification after writing into a memory from the memory, a history information retention section configured to retain a history of the status as history information in an associated relationship with each of predetermined regions of the memory, and a region selection section configured to select a region which satisfies a condition in accordance with the history information when a new region is to be used in the memory. According to the first embodiment of the present technology, there is further provided a storage controlling method including acquiring status including a number of times of execution of verification after writing into a memory from the memory, retaining a history of the status as history information into a history information retention section in an associated relationship with each of predetermined regions of the memory, and selecting a region which satisfies a condition in accordance with the history information when a new region is to be used in the memory. In the storage controlling apparatus and the storage controlling method, a region of the memory which satisfies a condition is selected in accordance with history information of verification after a writing operation.

The storage controlling apparatus may be configured such that the region selection section selects, in the case where a high speed performance is required as the condition, a region based on the number of times of execution of the verification in the history information. In the storage controlling apparatus, a region of the memory which satisfies a condition of a high speed performance is selected. In this instance, particularly a region with regard to which the number of times of execution of the verification is comparatively small in the history information may be selected.

The storage controlling apparatus may be configured such that the status acquisition section receives a number of errors detected in the verification as the status, and the region selection section selects, in the case where high reliability is required as the condition, a region based on the detected number of errors in the history information. In the storage controlling apparatus, a region of the memory which satisfies a condition of high reliability is selected. In this instance, particularly a region in which the detected number of errors is comparatively small in the history information may be selected.

The storage controlling apparatus may further include a parameter designation section configured to designate a parameter in accordance with the history information when writing into the memory is to be carried out newly. In the storage controlling apparatus, writing is executed using the designated parameter.

The storage controlling apparatus may be configured such that the parameter designation section designates a number of errors permissible in verification after writing as the parameter. In the storage controlling apparatus, writing is executed using the designated permissible error number as an upper limit.

The storage controlling apparatus may be configured such that the status acquisition section receives the number of errors detected in the verification as the status, and the parameter designation section designates, as the parameter, the number of permissible errors in accordance with the detected number of errors included in the history information. In the storage controlling apparatus, a permissible error number is designated in accordance with the error number detected upon writing in the past to execute writing.

The storage controlling apparatus may be configured such that the parameter designation section designates, as the parameter, an initial value of a voltage level of a pulse to be applied in the memory upon writing. In the storage controlling apparatus, a pulse is applied using the designated voltage level as an initial value to execute writing.

The storage controlling apparatus may be configured such that the history information retention section retains, as the history information, the initial value of the voltage level designated as the parameter, and the parameter designation section designates, as the parameter, an initial value of a voltage level of a pulse to be applied in the memory upon new writing in accordance with the initial value of the voltage level included in the history information. In the storage controlling apparatus, an initial value for the voltage level for new writing is designated in accordance with the initial level of the voltage level upon writing in the past to execute writing.

According to a second embodiment of the present technology, there is provided a storage apparatus including a memory array, a verification section configured to execute verification after writing into the memory array, a verification time number counter configured to count a number of times of execution of the verification, a status acquisition section configured to acquire status including the number of times of execution of the verification, a history information retention section configured to retain a history of the status as history information in an associated relationship with each of the predetermined regions of the memory array, and a region selection section configured to select a region which satisfies a condition in accordance with the history information when a new region is to be used in the memory array. In the storage apparatus, a region of the memory which satisfies a condition is selected in accordance with history information of verification after a writing operation into the memory array.

The storage apparatus may be configured such that it further includes a detection error number counter configured to count a number of errors detected in the verification, and the status acquisition section receives the number of errors detected as the status, and the region selection section selects, where high reliability is required as the condition, a region in which the detected number of errors is comparatively small in the history information. In the storage apparatus, a region of the memory which satisfies a condition of high reliability is selected.

According to a third embodiment of the present technology, there is provided an information processing system including a memory array, a verification section configured to execute verification after writing into the memory array, a verification time number counter configured to count a number of times of execution of the verification, a status acquisition section configured to acquire status including the number of times of execution of the verification, a history information retention section configured to retain a history of the status as history information in an associated relationship with each of the predetermined regions of the memory array, a region selection section configured to select a region which satisfies a condition in accordance with the history information when a new region is to be used in the memory array, and a host computer configured to issue a write command to the memory array. In the information processing system, when a write command issued newly is executed, a region of the memory which satisfies a condition in accordance with history information of verification after writing into the memory array is selected.

In summary, with the storage controlling apparatus and method, storage apparatus and information processing system according to the present technology, a superior advantage that a region of the memory to be used can be selected in accordance with a performance required for the memory can be anticipated.

BRIEF DESCRIPTION OF THE DRAWINGS

FIG. 1 is a block diagram showing an example of a configuration of an information processing system according to a first embodiment of the present technology;

FIG. 2 is a block diagram showing an example of a functional configuration of a storage controlling part of the information processing system of FIG. 1;

FIG. 6 is a view illustrating an example of a configuration of a history information management table shown in FIG. 2;

FIG. 14 is a view illustrating an example of a configuration of an address conversion table of the information processing system of FIG. 12;

FIGS. 15 and 16 are views illustrating an example of a configuration of history information management tables of the nonvolatile memories shown in FIG. 12;

FIG. 17 is a flow chart illustrating an example of a processing procedure of a logic page write process of a storage controlling part shown in FIG. 12;

FIGS. 19 and 20 are views illustrating an example of a configuration of history information management tables of the nonvolatile memories shown in FIG. 18;

DETAILED DESCRIPTION OF THE PREFERRED EMBODIMENTS

Figure 3:
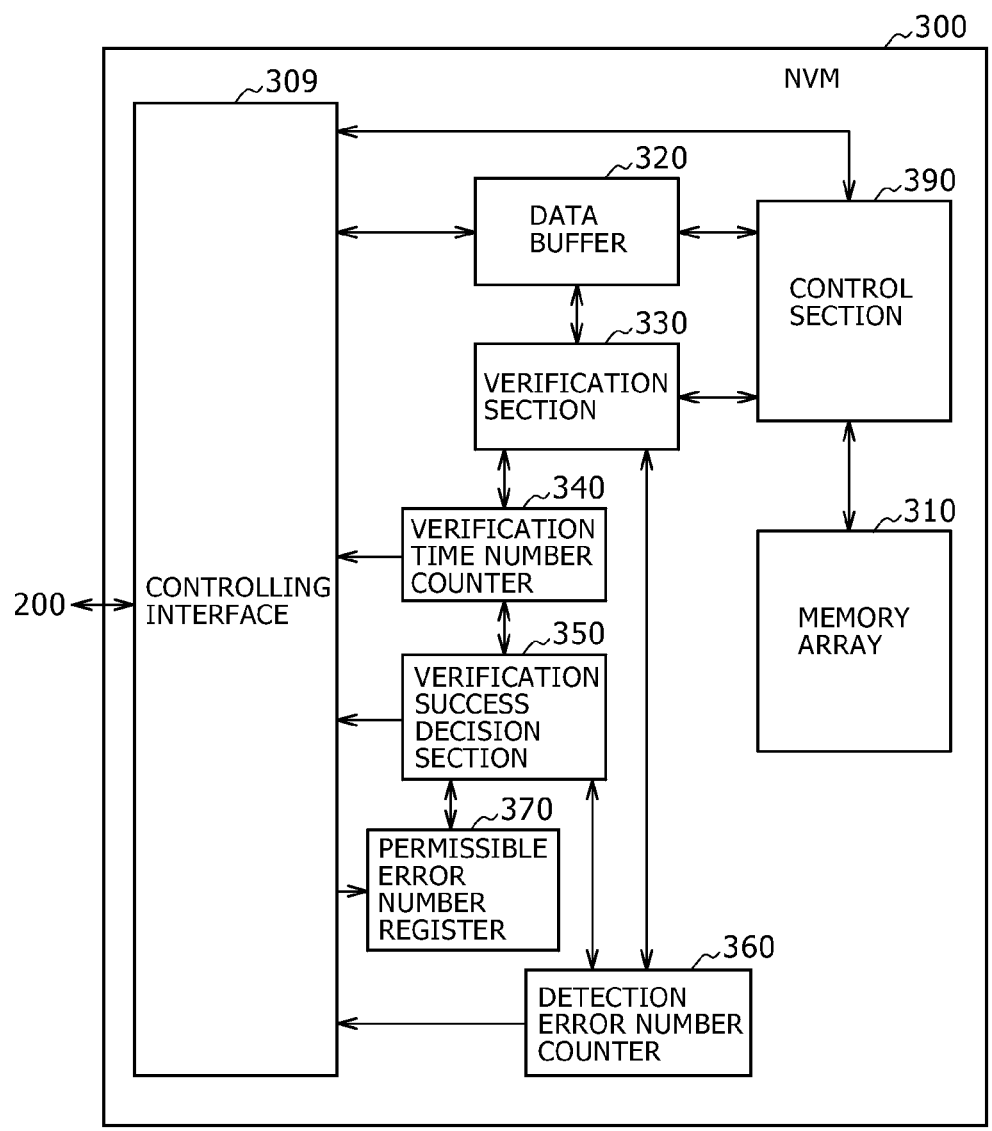
FIG. 3 is a block diagram showing an example of a configuration of a nonvolatile memory of the information processing system of FIG. 1.

In the following, embodiments of the present technology are described. The description is given in the following order.

1. First Embodiment (example wherein history information includes a verification execution time number and a detection error number)

2. Second Embodiment (example wherein a plurality of NVMs are used in combination)

3. Third Embodiment (example wherein history information includes a verification execution time number and a start level of an application pulse)

1. First Embodiment

Configuration of the Information Processing System

FIG. 1 shows an example of a configuration of an information processing system according to a first embodiment of the present technology. Referring to FIG. 1, the information processing system is configured from a host computer 100, a storage controlling part 200, and a nonvolatile memory (NVM) 300. The storage controlling part 200 and the nonvolatile memory 300 configure a storage system.

The host computer 100 issues a command for requesting reading or writing of data from or into the nonvolatile memory 300.

The storage controlling part 200 communicates with the host computer 100 to receive a command and executes writing of data into the nonvolatile memory 300 and reading out of data from the nonvolatile memory 300. When a write command is received, the storage controlling part 200 writes data received from the host computer 100 into the nonvolatile memory 300. On the other hand, when a read command is received, the storage controlling part 200 reads out data from the nonvolatile memory 300 and transfers the data to the host computer 100.

When the host computer 100 executes the write command or the read command, it uses a logical address as an address representative of position information of data in the storage controlling part 200. The logical address is addressed, for example, by 512 bytes. When the host computer 100 executes the write command or the read command, it designates a top logical address at which accessing is to be started and a data size. The value designated by the data size is n which is represented by 512×n bytes.

The storage controlling part 200 includes a processor 210, a RAM 220, a ROM 230, an ECC processing section 240, a host interface 201 and an NVM interface 203.

The processor 210 controls the entire storage controlling part 200. This processor 210 executes software stored in the ROM 230. The RAM 220 is a volatile memory and is used as a working memory for the processor 210 or an area for temporarily retaining data to be used for management of the nonvolatile memory 300. Further, the RAM 220 is used also as an area for temporarily retaining data to be transferred between the host computer 100 and the storage controlling part 200 and an area for temporarily retaining data to be transferred between the storage controlling part 200 and the nonvolatile memory 300. The ROM 230 is a memory in which a software program for controlling the storage system is stored.

The ECC processing section 240 executes generation of an error correction code (ECC) for data to be recorded into the nonvolatile memory 300 and an error correction process of data read out from the nonvolatile memory 300.

The nonvolatile memory 300 operates as a storage area of the storage system. The nonvolatile memory 300 carries out a program operation and an erasure operation as a writing process based on the write command from the host computer 100. In the program operation, an arbitrary value is written into a designated region of a memory array of the nonvolatile memory 300. In the erasure operation, a designated region of the memory array of the nonvolatile memory 300 is erased. In both of the program operation and the erasure operation, reading out for verification (verify) is carried out immediately later to carry out confirmation of whether or not the program operation and the erasure operation have been carried out with certainty.

The host interface 201 is connected to the host computer 100 and executes reception of a command from the host computer 100 and reception and transmission of data by and to the host computer 100.

The NVM interface 203 is connected to the nonvolatile memory 300 and executes transmission of an instruction to the nonvolatile memory 300, transmission of write data and reception of read data.

[Functional Configuration of the Storage Controlling Part]

FIG. 2 shows an example of a functional configuration of the storage controlling part 200 in the first embodiment of the present technology. Here, the storage controlling part 200 includes a address conversion table 221, a history information management table 222, a status acquisition section 211, a page selection section 212 and a parameter designation section 213 as functional blocks. It is to be noted here that FIG. 2 is focused on functions relating to the present embodiment while functions relating to ordinary memory accessing are omitted in FIG. 2.

The address conversion table 221 is used for conversion from a logical address into a physical address. Since a logical address is usually used in a command from the host computer 100, the address conversion table 221 is used for conversion into a physical address.

The history information management table 222 retains and manages history information of a write process of the nonvolatile memory 300. As the history information, status from the nonvolatile memory 300 can be used as hereinafter described. It is to be noted that the history information management table 222 is an example of a history information retention section.

The address conversion table 221 and the history information management table 222 are stored at positions of the nonvolatile memory 300 determined in advance while no power is supplied to the storage system. In an initialization process when the power is made available, the storage controlling part 200 reads out the two tables from the predetermined positions and temporarily retains the tables into the RAM 220. If a previous notice of turning off of the power supply is received from the host computer 100, then the storage controlling part 200 writes the two tables into determined positions of the nonvolatile memory 300. In order to minimize the influence of unexpected turning off of the power supply, preferably a process of writing data into the nonvolatile memory 300 is carried out for every fixed process. It is to be noted that a particular configuration of the address conversion table 221 and the history information management table 222 is hereinafter described.

The status acquisition section 211 acquires status of the nonvolatile memory 300 after writing from the nonvolatile memory 300. In the present first embodiment, a number of times by which verification is carried out, namely, a verification execution time number, and an error number detected by the verification, namely, a detection error number, are assumed as the status. Here, the error number is a number of bits with which an error occurs. The status acquired by the status acquisition section 211 is used for updating of the address conversion table 221 and the history information management table 222.

The page selection section 212 selects, when a new region in the nonvolatile memory 300 is to be used, a physical page which satisfies a condition in accordance with history information retained in the history information management table 222. The condition here relates to an attribute of a page and may be, for example, high reliability or a high speed performance. Designation of such a condition as just described can be carried out upon writing from the host computer 100. Or, upon writing from the host computer 100, a condition may be estimated, based on a physical address designated upon writing from the host computer 100, from a nature of a region to which the logical address belongs. For example, if the logical address belongs to a file management region, then it can be estimated that high reliability is required. When the page selection section 212 selects a new physical page and allocates the physical page to a logical page, it registers a combination of the physical page and the logical page into the address conversion table 221.

The parameter designation section 213 designates, when it instructs the nonvolatile memory 300 to carry out a write process, a parameter to be used in the write process. In the present first embodiment, an error number permissible upon verification of a write process, namely, a permissible error number, is assumed as the parameter. As described hereinabove, the storage controlling part 200 includes the ECC processing section 240, and some errors can be permitted if the errors remain within a range within which they can be corrected by the ECC processing section 240. Therefore, in the present embodiment, upon instruction of a write process, the permissible error number can be designated as the parameter.

[Configuration of the Nonvolatile Memory]

FIG. 3 shows an example of a configuration of the nonvolatile memory 300 in the first embodiment of the present disclosure. Referring to FIG. 3, the nonvolatile memory 300 includes a memory array 310, a data buffer 320, a verification section 330, a verification time number counter 340, a verification success decision section 350, a detection error number counter 360, a permissible error number register 370 and a control section 390.

The nonvolatile memory 300 further includes a controlling interface 309 which is an interface with the storage controlling part 200. The controlling interface 309 carries out reception of a command, a physical address and a parameter from the storage controlling part 200, reception of write data to the memory array 310, transmission of read data from the memory array 310 and reception and transmission of control data.

The memory array 310 is a nonvolatile memory array and includes a large number of memory cells arrayed two-dimensionally for storing one of binary values for each bit. The unit of commands from the host computer 100 for accessing the memory array 310 is a physical page. The physical page has a physical page address allocated thereto.

The data buffer 320 temporarily retains write data outputted from the storage controlling part 200 and read data read out from the memory array 310.

The verification section 330 executes a verification process (verify) of write data written in the memory array 310. The verification time number counter 340 counts the number of times by which a verification process is carried out by the verification section 330.

The detection error number counter 360 counts the number of errors detected in a verification operation, namely, the number of bits with which an error occurs. The permissible error number register 370 temporarily retains a permissible error number received from the storage controlling part 200 as a parameter. The verification success decision section 350 decides based on the parameter retained in the permissible error number register 370 and the number counted by the detection error number counter 360 whether or not a write process instructed by the storage controlling part 200 finally results in success.

The control section 390 controls writing, erasure and reading out processes of data into, in and from the memory array 310.

[Data Configuration in the Nonvolatile Memory]

Figures 4, 5:
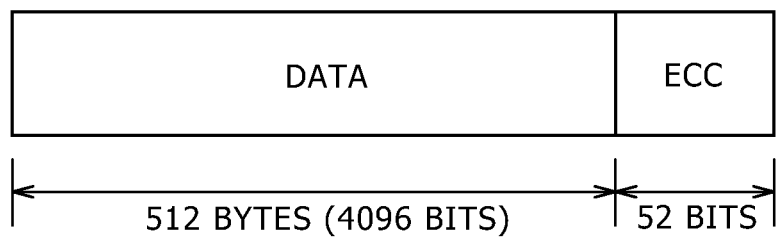
FIG. 4 is a view illustrating an example of a configuration of data stored in the nonvolatile memory of FIG. 3.
FIG. 5 is a view illustrating an example of a configuration of an address conversion table shown in FIG. 2.

FIG. 4 illustrates an example of a configuration of data stored in the nonvolatile memory 300 in the first embodiment of the present technology. Referring to FIG. 4, the unit of commands from the host computer 100 for accessing the nonvolatile memory 300 is a physical page. In the present example, it is assumed that the physical page is configured from 512 bytes, namely, from 4,096 bits. Further, the ECC processing section 240 generates an error correction code of 52 bits for data of 512 bytes. Accordingly, the overall length of the physical page is 4,148 bits. This error correction code assumes that it has a correction capacity of 4 bits for data of 512 bytes.

[Configuration of the Address Conversion Table]

FIG. 5 illustrates an example of a configuration of the address conversion table 221 in the first embodiment of the present technology. Referring to FIG. 5, the address conversion table 221 retains a data flag and a physical page address in an associated relationship with a logical address of a logical page.

The data flag indicates whether or not valid data is written at a corresponding logical address. If valid data is written, then the data flag indicates "True," but if valid data is not written, then the data flag indicates "False." When the data flag indicates "False," no valid address is retained at the physical page address.

[Configuration of the History Information Management Table 222]

FIG. 6 illustrates an example of a configuration of the history information management table 222 in the first embodiment of the present technology. Referring to FIG. 6, the history information management table 222 retains history information of a state of and a write process into the nonvolatile memory 300 in an associated relationship with each physical page address of the nonvolatile memory 300.

Here, the state of the nonvolatile memory 300 is a use state of the physical page and can assume three values of "used," "blank" and "not erased." The "used" represents that valid data is written at the pertaining physical page address and the nonvolatile memory 300 is managed by the address conversion table 221. The "blank" represents that an erasure operation has been executed for the pertaining physical address and a program operation can be executed for the physical page address. The "not erased" represents that invalid data remains at the pertaining physical page address and it is necessary to execute an erasure operation before a program operation is executed.

As the history information of the write process, in the present embodiment, a detection error number in verification and a verification execution time number are retained in the past three operation cycles with regard to a program operation and an erasure operation.

[Operation of the Information Processing System]

Figure 7:
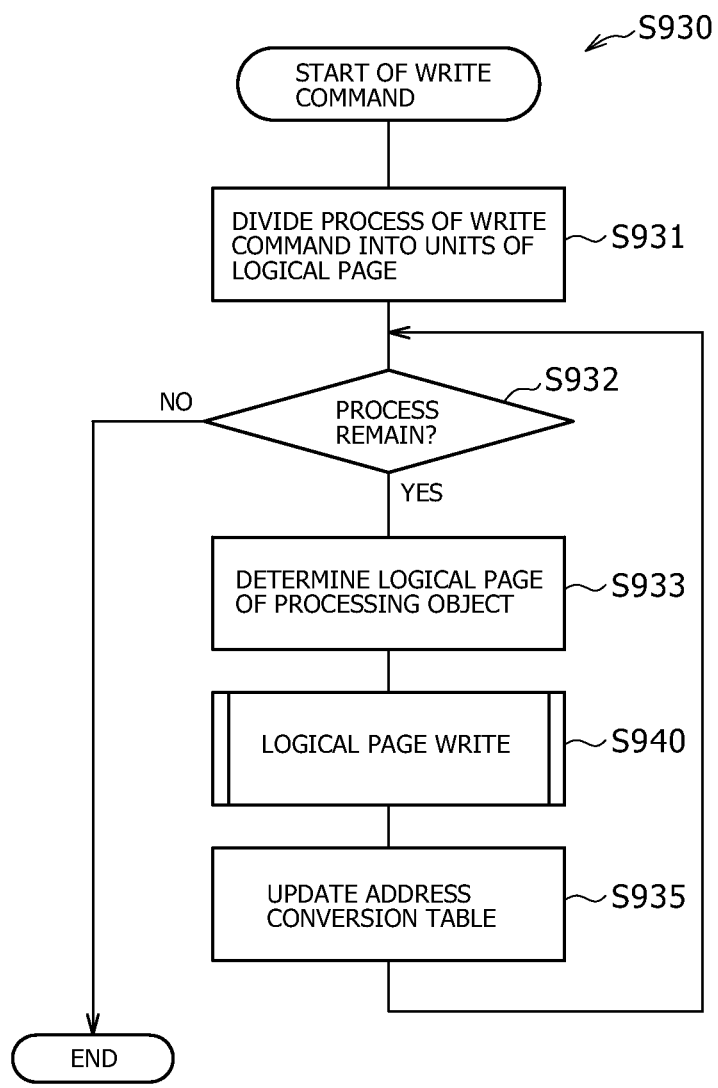
FIG. 7 is a flow chart illustrating an example of a write command processing procedure of the storage controlling part of FIG. 2.

FIG. 7 illustrates an example of the write command processing procedure of the storage controlling part 200 in the first embodiment of the present technology. More particularly, FIG. 7 illustrates operation of the storage controlling part 200 when the write command is issued from the host computer 100 to the storage controlling part 200. Through the write command, the storage controlling part 200 receives a top logical address, a data size and write data. The write data is temporarily stored into the RAM 220.

The processor 210 divides a write process to be executed based on the write command into processes for a unit of a logical page based on the top logical address and the data size at step S931. Consequently, processes described below are repetitively executed in a unit of a logical page until the write process to be executed based on the write command is completed for all logical pages at step S932.

In the write process in a unit of a logical page, the processor 210 first determines a logical page to be made a processing object at step S933. For example, from among those of the logical pages divided at step S932 which are not processed as yet, the logical page having the lowest logical address is determined as a processing object.

Then, at step S940, the processor 210 instructs the nonvolatile memory 300 to execute a write process of writing write data for one page, namely, write data of 512 bytes, retained in the RAM 220 into the logical page of the processing object determined at step S933. Details of the write process are hereinafter described.

After the write process is completed, the processor 210 updates the information relating to the page of the object of the write process in the address conversion table 221 at step S935. The updated information of the address conversion table 221 is the data flag and the physical page address. The data flag is updated to "True" if the value before the updating is "False," but maintains "True" if the value before the updating is "true." The value of the physical page address is updated to the physical page address into which the data has been written. After the updating, the processor 210 records the address conversion table 221 into the nonvolatile memory 300.

Figure 8:
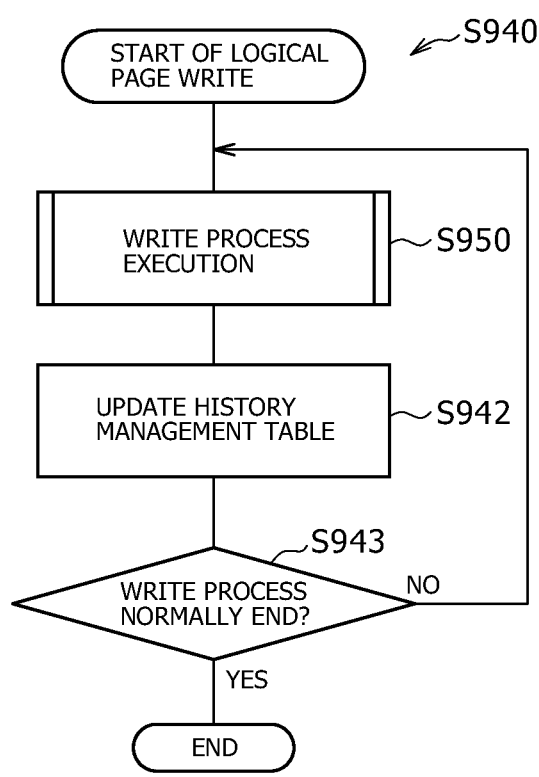
FIG. 8 is a flow chart illustrating an example of a processing procedure of a logical page write process of the storage controlling part of FIG. 2.

FIG. 8 illustrates an example of a processing procedure of the logical page writing process of the storage controlling part 200 in the first embodiment of the present technology, namely, at step S940 of FIG. 7. Referring to FIG. 8, the storage controlling part 200 issues, at step S950, an instruction to execute a write process into the nonvolatile memory 300 with regard to a logical page determined as a processing object at step S933. Thereupon, the processor 210 searches the nonvolatile memory 300 to select a physical page address which satisfies a required condition.

Then, if status is returned as a result of a write process from the nonvolatile memory 300, then the processor 210 updates the history information management table 222 based on the status at step S942.

In particular, the "detection error number" and the "verification execution time number" of the "program" at the physical page address for which the program operation has been executed in the history information management table 222 are updated based on a detection error number and a verification execution time number included in the status of the program operation. Further, the "state" at the physical page address at which the program operation has been executed is updated to "used" if the program operation ends normally, but to "not erased" if the program operation ends but abnormally.

Further, the "detection error number" and the "verification execution time number" of the "erased" at the physical page address for which the erasure operation has been executed in the history information management table 222 are updated with a detection error number and a verification execution time number included in the status of the erasure operation. Further, the "state" at the physical page address at which the erasure operation has been executed is updated to the "blank" if the erasure operation has ended normally, but to the "not erased" if the erasure operation has ended but abnormally.

The processor 210 records the history information management table 222 into the nonvolatile memory 300 after the history information management table 222 is updated.

If a result of the verification included in the status indicates success of the verification, namely, if the decision at step S943 is Yes, then it is determined that the write process has ended normally and the write process of the logical page is ended. On the other hand, if the verification result included in the status indicates failure of the verification, namely, if the decision at step S943 is No, then the processing returns to step S950, at which an instruction to execute a write operation is issued to the nonvolatile memory 300.

Figure 9:
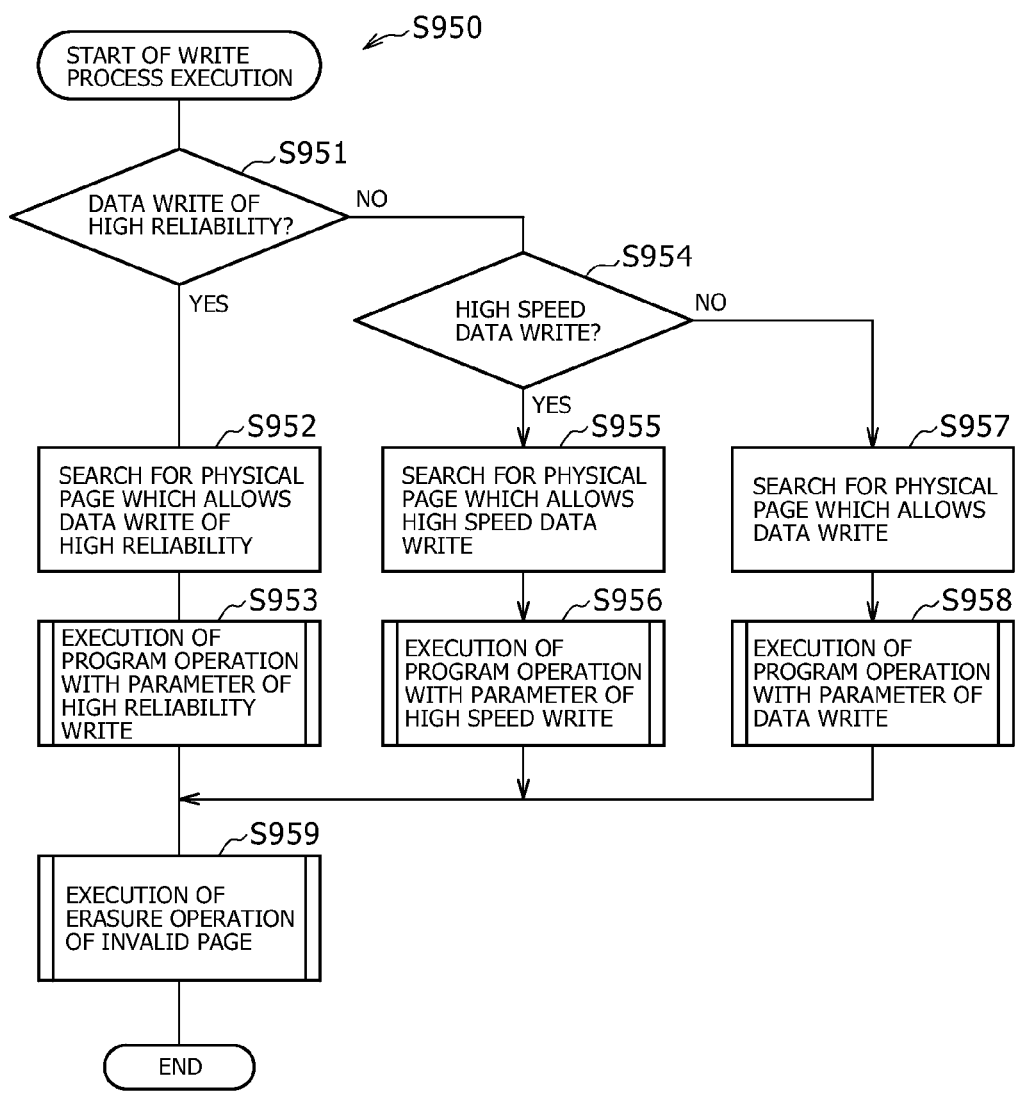
FIG. 9 is a flow chart illustrating an example of a processing procedure of a write process in the processing procedure of FIG. 8.

FIG. 9 illustrates an example of a processing procedure of the write process of the storage controlling part 200 in the embodiment of the present technology, namely, of the write process at step S950 of FIG. 8. Referring to FIG. 9, the processor 210 decides whether or not it is requested to record write data into a physical page of high reliability at step S951. If it is decided that high reliability is required, namely, if the decision at step S951 is Yes, then the processor 210 searches for a physical page which allows data writing of high reliability and selects the searched out physical page as a physical page for which a program operation is to be executed at step S952.

Here, the processor 210 refers to the history information management table 222 to search for a physical page from which a comparatively small number of errors has been detected by verification upon execution of the program operation regarding the physical page as a physical page which has high reliability. Weighting is carried out for the history information such that importance is attached to recent execution results so that they have a comparatively high influence on the search results. In the following, description is given using the example illustrated in FIG. 6.

The processor 210 searches the physical pages in order beginning with the physical page address "0x00000000" (numerals following "0x" are hexadecimal numbers: this similarly applies also in the following description) to search for a physical page wherein the state is "blank" and the value X1 calculated in accordance with an expression given below is lowest:

$$X1 = \text{(detection error number upon program operation one cycle before)} \times 3 + \text{(detection error number upon program operation two cycles before)} \times 2 + \text{(detection error number upon program operation three cycles before)} \times 1$$

if the physical page addresses wherein the state is "blank" are only "k+1," "k+2" and "k+3," then the processor 210 selects the physical page address "k+2."

It is to be noted that, since it is assumed that the error correction capacity of the ECC processing section 240 is 4 bits, a physical page wherein the "detection error number upon program operation" is greater than "4" in the history information management table 222 is regarded as a physical page which suffers from a failure and is not determined as an object of the search. This similarly applies also to steps S955 and S957.

The processor 210 carries out, at step S953, a program operation for the physical page selected at step S952. Here, as a parameter to be used when high reliability is required, the permissible error number upon verification operation is designated as "0."

If it is decided at step S951 that high reliability is not required, namely, if the decision at step S951 is No, then the processor 210 decides at step S954 whether or not high speed data writing is required for the write data. If it is decided at step S954 that high speed data writing is required for the write data, namely, if the decision at step S954 is Yes, then the processor 210 searches for a physical page which allows high speed data writing and selects the searched out physical page as a physical page for which a program operation is to be executed at step S955.

Here, the processor 210 refers to the history information management table 222 to search for a physical page with regard to which the verification execution time number upon execution of a program operation is comparatively small regarding the physical page as a physical page which allows high speed data writing. Weighting is carried out for the history information such that importance is attached to recent execution results so that they have a comparatively high influence on the search results. In the following, description is given using the example illustrated in FIG. 6.

The processor 210 searches the physical pages in order beginning with the physical page address "0x00000000" to search for a physical page wherein the state is "blank" and the value X2 calculated in accordance with an expression given below is lowest:

$$X2=\text{(verification execution time number upon program operation one cycle before)} \times 3 + \text{(verification execution time number upon program operation two cycles before)} \times 2 + \text{(verification execution time number upon program operation three cycles before)} \times 1$$

if the physical page addresses wherein the state is "blank" are only "k+1," "k+2" and "k+3," the processor 210 selects the physical page address "k+1."

The processor 210 carries out, at step S956, a program operation for the physical page selected at step S955. Here, as the parameter when a high speed performance is required, the permissible error number upon verification operation is designated as "4." This is because, although it is expected that, where the permissible error number upon verification operation has a comparatively high value, the processing of the program operation executed by the nonvolatile memory 300 is completed earlier, since the error correction capacity of the ECC processing section 240 is assumed as 4 bits, the maximum value of the permissible error number is "4."

If it is decided at step S954 that a high speed performance is not required, namely, if the decision at step S954 is No, then the processor 210 searches for a physical page which satisfies none of high reliability and a high speed performance at step S957. Here, the processor 210 refers to the history information management table 222 to search for a physical page which is less likely to hit in the search at step S952 or S955.

The processor 210 searches the physical pages in order beginning with the physical page address "0x00000000" to search for a physical page wherein the state is "blank" and the "detection error number upon program operation one cycle before" is "3." If no pertaining physical page is searched out, then the processor 210 searches for a physical page wherein the "detection error number upon program operation two cycles before" is "3" and a physical page wherein the "detection error number upon program operation three cycles before" is "3" in order. If such searches still result in failure, then a physical page wherein the "detection error number upon program operation one cycle before" is "2," a physical page wherein the "detection error number upon program operation two cycles before" is "2" and a physical page wherein the "detection error number upon program operation three cycles before" is "2" in order. In the example illustrated in FIG. 6, a physical page whose physical page address is "k+3" is selected.

The processor 210 carries out, at step S958, a program operation for the physical page selected at step S957. Here, as the parameter in the case where none of high reliability and a high speed performance is required, the "detection error number upon program operation one cycle before" of the physical page searched out at step S957 is utilized as it is to designate the permissible error number upon verification operation as "3."

If a program operation is executed at step S953, S956 or S958, then the processor 210 executes, at step S959, an erasure operation for a physical page with regard to which the write data is invalidated by the program operation.

When this erasure operation is executed, the "permissible detection error number" to be designated by the processor 210 is designated in accordance with the following conditions according to the program operation immediately prior to the erasure operation. For the erasure operation after the program operation at step S953, the "permissible detection error number" is designated as "0." For the erasure operation after the program operation at step S956, the "permissible detection error number" is designated as "4." For the erasure operation after the program operation at step S958, the "permissible detection error number" is designated as "0."

In this example of the processing procedure, the decision that high reliability and/or a high speed performance are required is carried out. However, they can be designated as parameters when the host computer 100 issues the write command. Further, the decision may be carried out uniquely by the storage controlling part 200. For example, a case is assumed wherein the FAT (File Allocation Table) method is adopted as the storage system. In the FAT method, the file allocation table represents position information of a file, and if the data is destroyed, then it sometimes becomes impossible to read the file. This file allocation table is written into a specific logical address region. If the logical address designated in the write command by the host computer 100 is in a logical address region of the file allocation table, the storage controlling part 200 can execute the process deciding that high reliability is required for writing. Further, wiring into the address conversion table 221 or the history information management table 222 handled by the storage controlling part 200 may be handled as writing for which high reliability is required.

Figure 10:
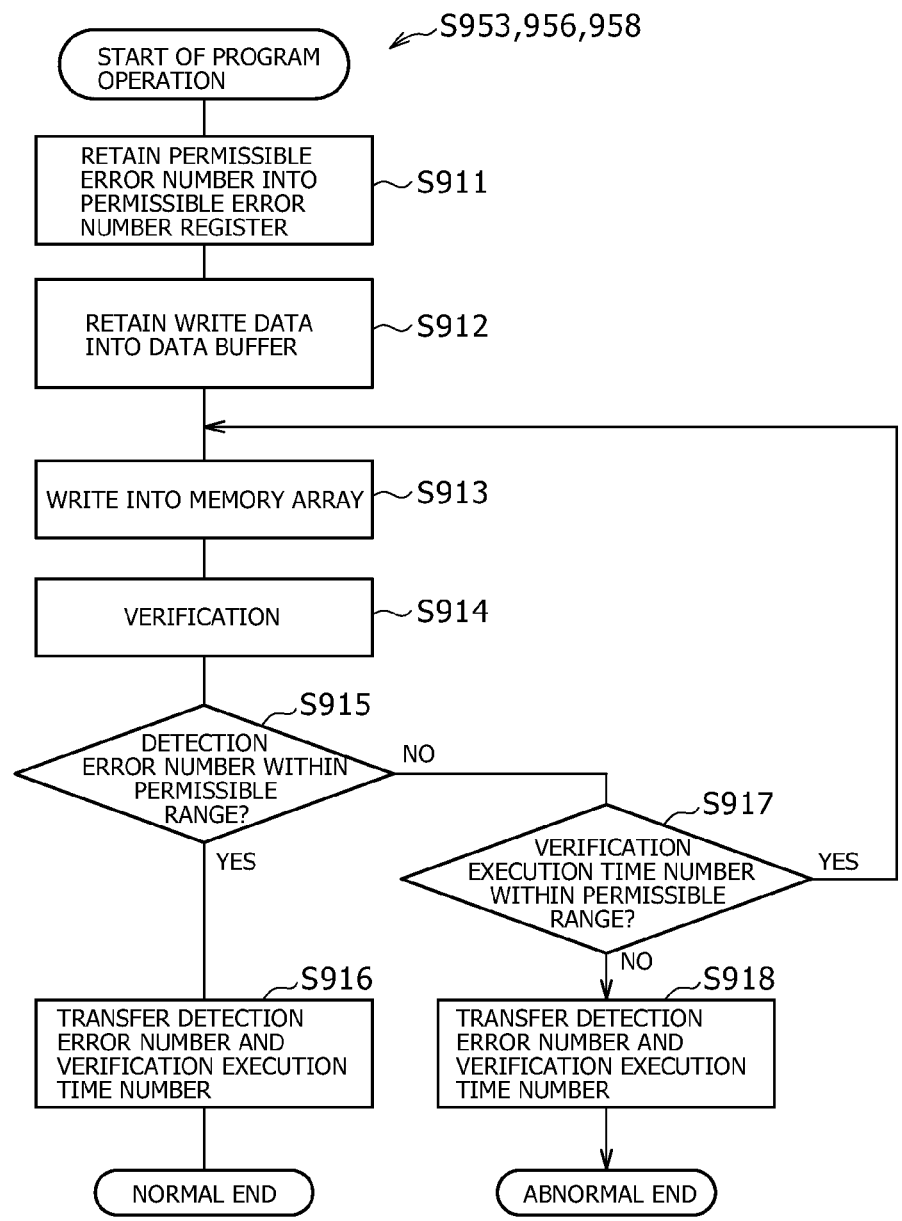
FIG. 10 is a flow chart illustrating an example of a processing procedure of a program operation in the processing procedure of FIG. 9.

FIG. 10 illustrates an example of a processing procedure of the program operation of the nonvolatile memory 300 in the embodiment of the present technology, namely, the program operation at steps S953, S956 and S958 of FIG. 9. When the nonvolatile memory 300 receives an instruction of a program operation from the storage controlling part 200 by the controlling interface 309 thereof, it starts a program operation. Upon starting of the program operation, the number retained in the verification time number counter 340 is in an initialized state to "0."

The permissible error number register 370 retains, at step S911, a permissible error number received as the parameter by the controlling interface 309. Then at step S912, the data buffer 320 retains write data received by the controlling interface 309.

Then at step S913, a physical address received by the controlling interface 309 is transferred to the control section 390 and the write data retained in the data buffer 320 is written into the designated physical address of the memory array 310. Then, in order to verify whether or not the write data has been written with certainty, the data is read out from the physical page address and is compared with the write data retained in the data buffer 320 by the verification section 330 at step S914. As a result, the number of bits which do not exhibit coincidence is counted by the detection error number counter 360. Further, the verification time number of the verification time number counter 340 is incremented by one.

The detection error number counted by the detection error number counter 360 and the permissible error number retained in the permissible error number register 370 are compared with each other by the verification success decision section 350 to decide whether or not the detection error number remains within the permissible range at step S915. Then, if the detection error number is equal to or smaller than the permissible error number, namely, if the decision at step S915 is Yes, then the processing ends normally. In this instance, the detection error number counted by the detection error number counter 360 and the verification time number retained in the verification time number counter 340 are transferred as status to the storage controlling part 200 at step S916.

If it is decided at step S915 that the detection error number is greater than the permissible error number, namely, if the decision at step S915 is No, then the verification execution time number retained in the verification time number counter 340 and a verification operation maximum execution time number determined in advance upon fabrication of the nonvolatile memory 300 are compared with each other at step S917. Then, if the verification execution time number is equal to or smaller than the verification operation maximum execution time number, namely, if the decision at step S917 is Yes, then the processing procedure at the steps beginning with step S913 is repeated. On the other hand, if the verification execution time number is greater than the verification operation maximum execution time number, namely, if the decision at step S917 is No, then the processing ends but abnormally. In this instance, the detection error number counted by the detection error number counter 360 and the verification time number retained in the verification time number counter 340 are transferred as status to the storage controlling part 200 at step S918.

Figure 11:
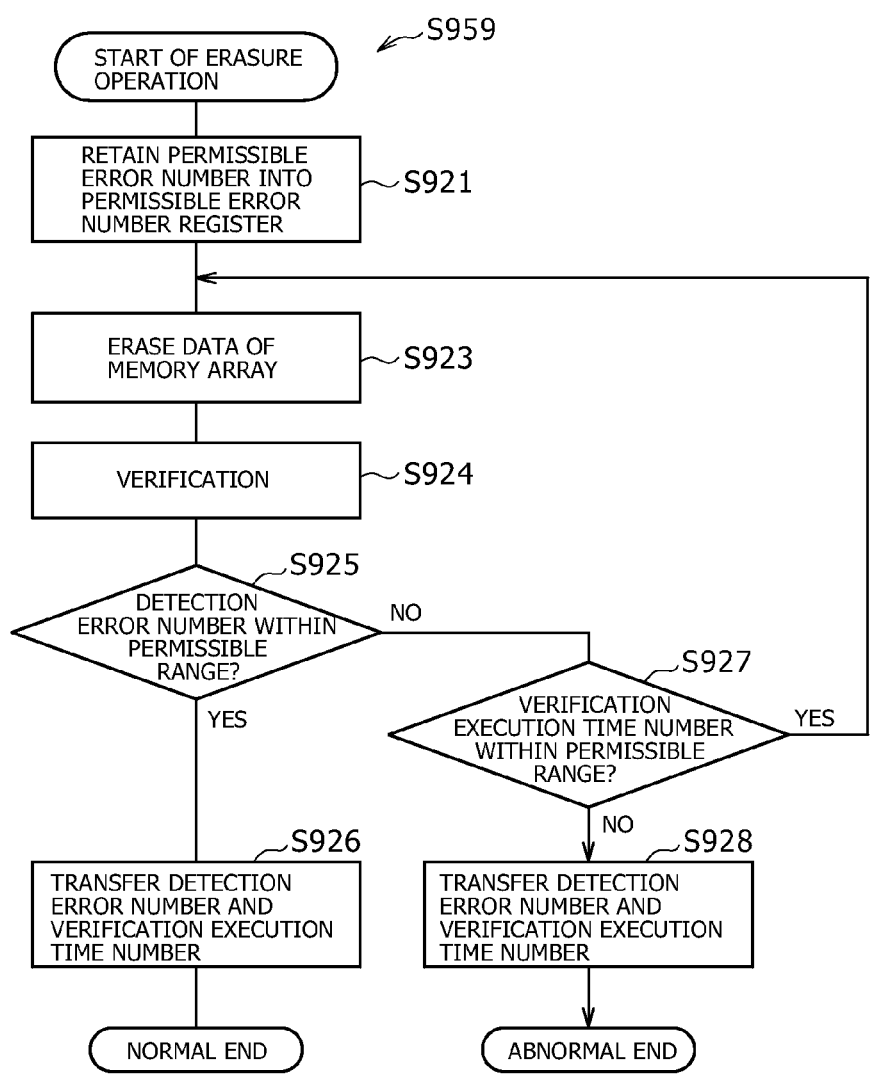
FIG. 11 is a flow chart illustrating an example of a processing procedure of an erasure operation in the processing procedure of FIG. 10.

FIG. 11 illustrates an example of a processing procedure of the erasure operation of the nonvolatile memory 300 in the embodiment of the present disclosure, namely, the operation at step S959 of FIG. 9. When an instruction for an erasure operation from the storage controlling part 200 is received at the controlling interface 309, the nonvolatile memory 300 starts an erasure operation. Upon starting of the erasure operation, the number retained in the verification time number counter 340 is in an initialized state to "0."

Referring to FIG. 11, a permissible error number received as a parameter by the controlling interface 309 is retained into the permissible error number register 370 at step S921.

Then, a physical address received by the controlling interface 309 is transferred to the control section 390 so that erasure is carried out at the designated physical address of the memory array 310 at step S923. In order to verify whether or not the erasure has been carried out with certainty, data is read out from the physical page address and is compared with data expected as data after the erasure, for example, data all bits of which are "1," at step S924. Then, the number of those bits which do not exhibit coincidence is counted by the detection error number counter 360. Further, the verification time number of the verification time number counter 340 is incremented by one.

The detection error number counted by the detection error number counter 360 and a permissible error number retained in the permissible error number register 370 are compared with each other by the verification success decision section 350 to decide whether or not the detection error number remains within the permissible range at step S925. If the detection error number is equal to or smaller than the permissible error number, namely, if the decision at step S925 is Yes, then the processing ends normally. In this instance, the detection error number counted by the detection error number counter 360 and the verification time number retained in the verification time number counter 340 are transferred as status to the storage controlling part 200 at step S926.

On the other hand, if it is decided at step S925 that the detection error number is greater than the permissible error number, namely, if the decision at step S925 is No, then the verification execution time number retained in the verification time number counter 340 and a verification operation maximum execution time number determined in advance upon fabrication of the nonvolatile memory 300 are compared with each other at step S927. Then, if the verification execution time number is equal to or smaller than the verification operation maximum execution time number, namely, if the decision at step S927 is Yes, then the processing procedure at the steps beginning with step S923 is repeated. On the other hand, if the verification execution time number is greater than the verification operation maximum execution time number, namely, if the decision at step S927 is No, then the processing ends but abnormally. In this instance, the detection error number counted by the detection error number counter 360 and the verification time number retained in the verification time number counter 340 are transferred as status to the storage controlling part 200 at step S928.

In this manner, according to the fourth embodiment of the present technology, a physical page of an object of a write process can be selected based on history information of verification upon program operation and upon erasure so that a condition for high reliability or a high speed performance can be satisfied. Further, when a permissible error number upon verification operation is designated as the parameter in a write process, history information of verification upon program operation and upon erasure can be used. For example, as the parameter in the case where none of high reliability and a high speed performance in a program operation is required, the "detection error number upon program operation one cycle before" can be utilized to designate a permissible error number upon verification operation.

2. Second Embodiment

Configuration of the Information Processing System

Figure 12:
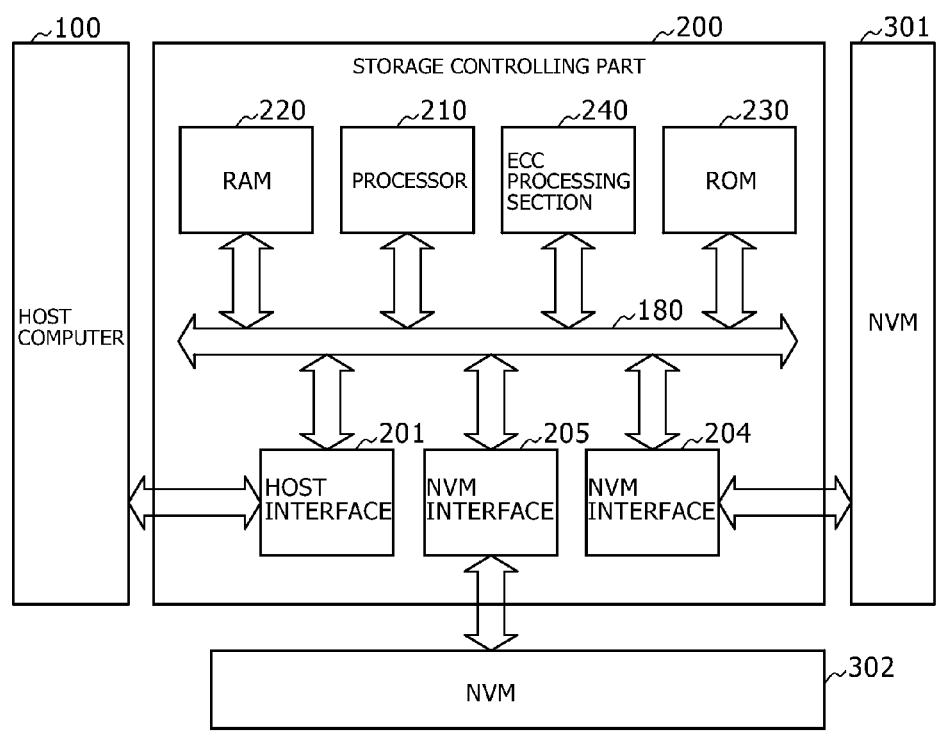
FIG. 12 is a block diagram showing an example of a configuration of an information processing system according to a second embodiment of the present technology.

FIG. 12 shows an example of a configuration of an information processing system of a second embodiment of the present technology. Referring to FIG. 12, the information processing system of the second embodiment is similar to that of the first embodiment except that it includes two nonvolatile memories 301 and 302. In a corresponding relationship, two NVM interfaces 204 and 205 are provided in the storage controlling part 200.

The nonvolatile memories 301 and 302 have a configuration similar to that of the nonvolatile memory 300 in the first embodiment described hereinabove with reference to FIG. 3. Further, the nonvolatile memories 301 and 302 operate similarly as in the processing procedure described hereinabove with reference to FIGS. 10 and 11.

[Data Configuration in the Nonvolatile Memories]

Figure 13A:
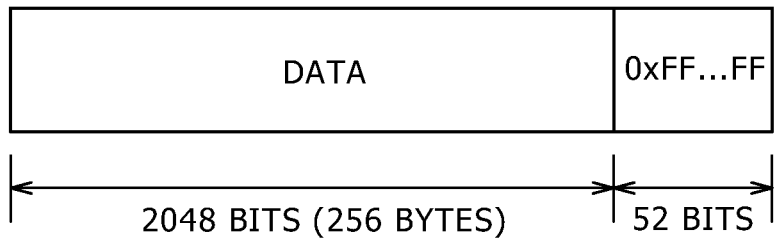
FIGS. 13A and 13B are views illustrating an example of a configuration of data stored in nonvolatile memories of the information processing system of FIG. 12.
Figure 13B:
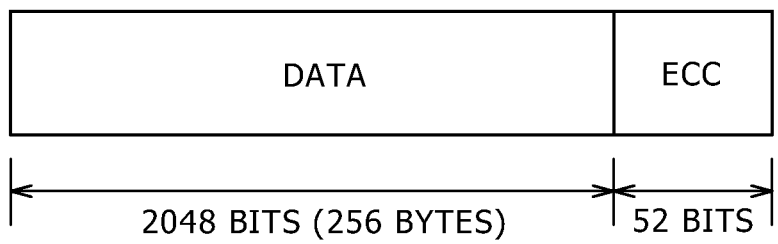

FIGS. 13A and 13B illustrate an example of a data configuration stored in the nonvolatile memories 301 and 302 in the second embodiment of the present technology. As described hereinabove, the unit of commands from the host computer 100 which accesses the nonvolatile memory 300 is a physical page, and also in the present embodiment, it is assumed that the physical page includes 512 bytes, namely, 4,096 bits.

It is to be noted, however, that, in the present embodiment, a physical page is divided into two portions and stored divisionally into the nonvolatile memories 301 and 302. In particular, 2,048 bits of the front half of the physical page are stored into the nonvolatile memory 301 as illustrated in FIG. 13A and 2,048 bits of the latter half of the physical page are stored into the nonvolatile memory 302 as illustrated in FIG. 13B. An error correction code of 52 bits for data of 512 bytes is stored into a region following data of 256 bytes of the nonvolatile memory 302. In a region following the data of the nonvolatile memory 301, for example, bits all of which exhibit "1" are placed. It is to be noted that, while an example wherein an error correction code is stored into the nonvolatile memory 302 is described, it may otherwise be stored into the nonvolatile memory 301.

[Configuration of the Address Conversion Table]

FIG. 14 illustrates an example of a configuration of the address conversion table 221 in the second embodiment of the present technology. Referring to FIG. 14, the address conversion table 221 retains a data flag, a first physical page address and a second physical page address in an associated relationship with a logical address of a logical page. The first physical page address indicates a physical page address in the nonvolatile memory 301, and the second physical page address indicates a physical page address in the nonvolatile memory 302. In other words, the physical address of the nonvolatile memory 301 in which the former half data of the physical page is stored is indicated as the first physical page address, and the physical address of the nonvolatile memory 302 in which the latter half data of the physical page is stored is indicated as the second physical page address.

It is to be noted that the data flag is similar to that in the first embodiment and indicates whether or not valid data is written in the corresponding logical address of the nonvolatile memories 301 and 302.

[Configuration of the History Information Management Table 222]

FIGS. 15 and 16 illustrate an example of a configuration of the history information management table 222 in the second embodiment of the present technology. While, in the first embodiment, history information is retained in the single nonvolatile memory 300, in the present second embodiment, history information is retained in the two nonvolatile memories 301 and 302. In FIG. 15, a state of the nonvolatile memory 301 and history information of a write process into the nonvolatile memory 301 are retained in an associated relationship with each first physical page address of the nonvolatile memory 301. In FIG. 16, a state of the nonvolatile memory 302 and history information of a write process into the nonvolatile memory 302 are retained in an associated relationship with each second physical page address of the nonvolatile memory 302.

The items of the state and the history information of a write process of the nonvolatile memory 301 or 302 retained in the history information management table 222 are similar to those described hereinabove in connection with the first embodiment.

[Operation of the Information Processing System]

Although the present second embodiment is different from the first embodiment in that it includes the two nonvolatile memories 301 and 302 as described above, except this, it is similar to the first embodiment. Accordingly, operation in the second embodiment is similar to that in the first embodiment except that processes for the two nonvolatile memories 301 and 302 are carried out. In particular, the processing procedures of FIGS. 7, 8, 10 and 11 are similar to those in the first embodiment.

FIG. 17 illustrates an example of a processing procedure of the logical page write process of the storage controlling part 200 in the second embodiment of the present technology, namely, of the process at step S940 of FIG. 17. Referring to FIG. 17, first at step S944, the storage controlling part 200 instructs the nonvolatile memory 301 to execute a writing process into a logical page determined as a processing object at step S933. Thereupon, the processor 210 searches the nonvolatile memory 301 to select a physical page address which satisfies a required condition.

Then, when status returns from the nonvolatile memory 301 as a result of the write process, the processor 210 updates the history information management table 222 based on the status at step S945. The contents of the updating process are similar to those in the first embodiment.

The processor 210 records the history information management table 222 into the nonvolatile memory 300 after it updates the history information management table 222.

If a verification result included in the status indicates success in verification at step S946, namely, if the decision at step S946 is Yes, then it is determined that the write process into the nonvolatile memory 301 is completed normally, and the processing advances to a write process into the nonvolatile memory 302. On the other hand, if the verification result indicates failure in verification at step S946, namely, if the decision at step S946 is No, then the processing returns to step S944, at which the processor 210 instructs the nonvolatile memory 301 to execute a write process.

If the write process into the nonvolatile memory 301 ends normally, then the storage controlling part 200 instructs, at step S947, the nonvolatile memory 302 to execute a write process into the logical page determined as a processing object at step S933. Thereupon, the processor 210 searches the nonvolatile memory 302 to select a physical page address which satisfies a required condition.

Then, if status returns as a result of a write process from the nonvolatile memory 302, then the processor 210 updates the history information management table 222 based on the status at step S948. The contents of the updating process are similar to those in the first embodiment.

The processor 210 records the history information management table 222 into the nonvolatile memory 300 after it updates the history information management table 222.

If the verification result included in the status indicates success in verification at step S949, namely, if the decision at step S949 is Yes, then the processor 210 determines that the write process is completed normally and ends the write process of the logical page. On the other hand, if the verification result indicates failure in verification at step S949, namely, if the decision at step S949 is No, then the processing returns to step S947, at which the processor 210 instructs the nonvolatile memory 302 to execute a write process.

While, in the first embodiment, a physical page of the nonvolatile memory 300 is selected in FIG. 9, in the present second embodiment, a physical page is selected from both of the nonvolatile memories 301 and 302.

At step S952 of FIG. 9, the processor 210 refers to the history information management table 222 to search for a physical page from which a comparatively small number of errors has been detected by verification upon execution of the program operation regarding the physical page as a physical page having high reliability. If, in the example illustrated in FIG. 15, the physical page addresses of the nonvolatile memory 301 wherein the state is "blank" are only "k+1," "k+2" and "k+3," then the processor 210 selects the physical page address "k+2." Further, in the example illustrated in FIG. 16, if the physical page addresses of the nonvolatile memory 302 wherein the state is "blank" are only "j," "j+2" and "j+3," then the processor 210 selects the physical page address of "j+2."

At step S955, the processor 210 refers to the history information management table 222 to search for a physical page with regard to which the verification execution time number upon execution of a program operation is comparatively small regarding the physical page as a physical page which allows high speed data writing. If, in the example illustrated in FIG. 15, the physical page addresses of the nonvolatile memory 301 wherein the state is "blank" are only "k+1," "k+2" and "k+3," then the processor 210 selects the physical page address "k+1." Further, in the example illustrated in FIG. 16, if the physical page addresses of the nonvolatile memory 302 wherein the state is "blank" are only "j," "j+2" and "j+3," then the processor 210 selects the physical page address of "j."

At step S957, the processor 210 refers to the history information management table 222 to search for a physical page which is less likely to hit in the search at step S952 or S955. In the example illustrated in FIG. 15, the physical page of the nonvolatile memory 301 whose the physical page address is "k+3" is selected. Further, the processor 210 searches for a physical page whose state is "blank" and with regard to which the "detection error number upon program operation one cycle before" satisfies the value X3 calculated in accordance with an expression given below as the physical page of the nonvolatile memory 302 which is to be used in combination with the selected physical page. Thereupon, the search is carried out successively beginning with the physical page address "0x00000000." If the search results in no hit, then the value X3 is decremented one by one until the search results in hit.

$$X3=4-\text{"detection error number upon program operation one cycle before" (of the page of the nonvolatile memory 301)}$$

"4" in the expression above is the number of bits of the error correction capacity of the ECC processing section 240. In the example illustrated in FIG. 15, since the physical page having the physical page address "k+3" is selected from the nonvolatile memory 301, the value X3 is "1." Further, in the example illustrated in FIG. 16, since the entry wherein the physical page address is "j" indicates "1," the processor 210 selects the physical page address "j."

In this manner, with the second embodiment of the present technology, by storing a physical page in a distributed manner in a plurality of nonvolatile memories 301 and 302, an optimal physical page can be selected more precisely.

3. Third Embodiment

In the first and second embodiments described above, a page is selected utilizing a detection error number by verification, and a permissible error number is designated as a parameter for a write process. In the present third embodiment, an example wherein a ReRAM (Resistance RAM) is assumed as a nonvolatile memory and a voltage level when a pulse is applied to a cell is utilized to select a page and is designated as a parameter for a write process.

When a write process of data is executed into a memory array of a ReRAM, a pulse is applied to a memory cell to vary the resistance value of the memory cell to write data into the memory cell. As a technique for applying a pulse, DSIP (Direct Sense In Programming) has been proposed wherein the voltage of the pulse to be applied to a cell, which has exhibited an error in verification in a cycle of repeating a write process and verification of data, is raised stepwise. This DSIP is disclosed, for example, in Wataru Otsuka et al, "A 4 Mb Conductive-Bridge Resistive Memory with 2.3 GB/s Read-Throughput and 216 MB/s Program-Throughput," ISSCC, pp. 20-21, February 2011. It is known that, as a nature of a memory cell, while it is possible to change the resistance value of a cell in short time by applying a high voltage, the data retaining characteristic of the memory cell is deteriorated. The DSIP is a technique which makes it possible to maintain the retaining characteristic of a memory cell taking dispersion arising from a fabrication process of cells in the same physical page and dispersion by a writing frequency of data into consideration. In particular, into a cell whose resistance can be varied by a low voltage, data is written by a pulse of a low voltage, but into a cell which requires a pulse of a high voltage to change the resistance value thereof, data is written by a high voltage.

The configuration of the information processing system and the functional configuration of the storage controlling part 200 are similar to those in the first or second embodiment, and therefore, description of them is omitted herein to avoid redundancy. The number of nonvolatile memories may be one as in the case of the first embodiment or a plural number as in the case of the second embodiment. In the following, it is assumed that two nonvolatile memories 301 and 302 are provided similarly as in the second embodiment.

[Configuration of the Nonvolatile Memories]

Figure 18:
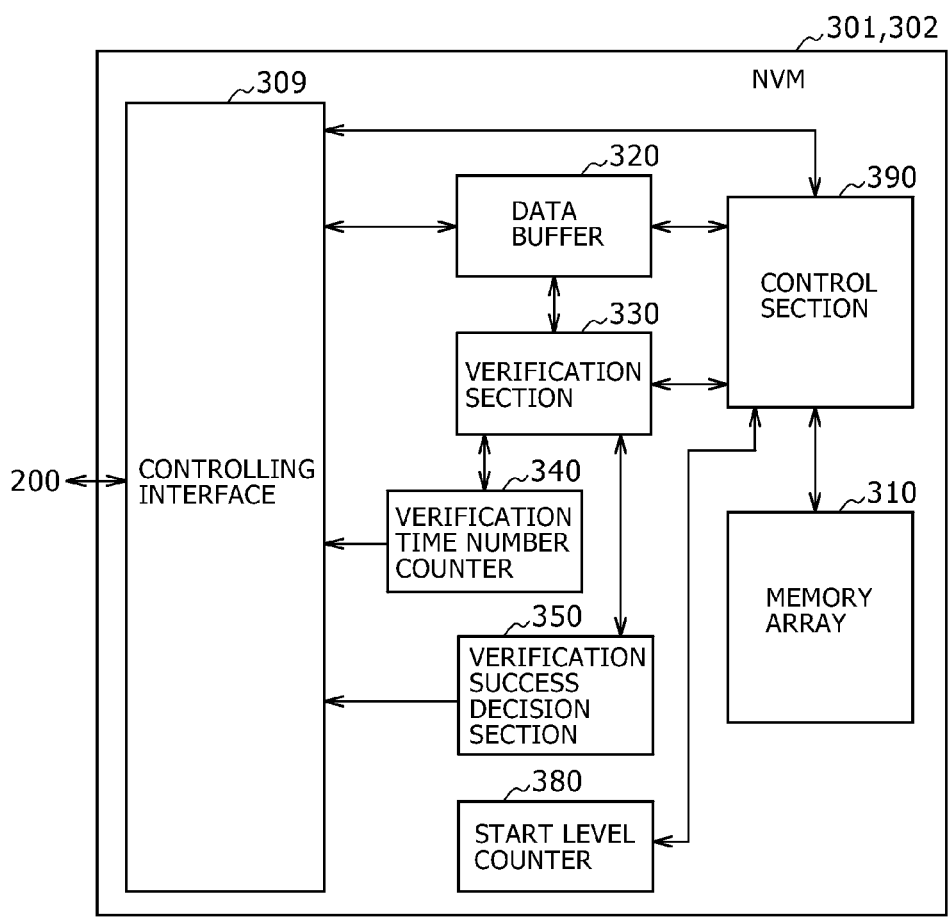
FIG. 18 is a block diagram showing an example of a configuration of nonvolatile memories in a third embodiment of the present technology.

FIG. 18 shows an example of a configuration of the nonvolatile memory 301 or 302 in the third embodiment of the present technology. Referring to FIG. 18, the nonvolatile memory 301 or 302 in the present third embodiment includes a voltage level counter 380 without including the detection error number counter 360 and the permissible error number register 370 which are provided in the nonvolatile memory in the first or second embodiment. The voltage level counter 380 retains a voltage level when a pulse is applied by the DSIP.

The control section 390 applies, upon a program operation or an erasure operation, a pulse by the DSIP to a cell at a designated physical page address. Here, it is assumed that a pulse is applied four times in the maximum and the pulse to be applied four times is set so as to have voltage levels 1 to 4 in order from the lowest voltage level. As a parameter when the storage controlling part 200 executes a program operation or an erasure operation, it can designate one of the levels 1 to 4. The control section 390 retains the voltage level designated as a parameter into the voltage level counter 380. The control section 390 applies a pulse by the DSIP using the voltage level retained in the voltage level counter 380 as a start level to execute a program operation or an erasure operation.

[Configuration of the Data in the Nonvolatile Memories]

The configuration of data stored in the nonvolatile memories 301 and 302 in the third embodiment of the present technology is similar to that in the second embodiment described hereinabove with reference to FIG. 13.

[Configuration of the Address Conversion Table]

The configuration of the address conversion table 221 in the third embodiment of the present technology is similar to that of the address conversion table 221 in the second embodiment described hereinabove with reference to FIG. 14.

[Configuration of the History Information Management Table 222]

FIGS. 19 and 20 illustrate an example of a configuration of the history information management table 222 in the third embodiment of the present technology. In FIG. 19, a state of the nonvolatile memory 301 and history information of a write process into the nonvolatile memory 301 are retained in an associated relationship with a first physical page address in the nonvolatile memory 301. In FIG. 20, a state of the nonvolatile memory 302 and history information of a write process into the nonvolatile memory 302 are retained in an associated relationship with a second physical page address in the nonvolatile memory 302.

While, in the first and second embodiments described hereinabove, a detection error number in verification and a verification execution time number are retained as history information of a write process, in the present third embodiment, a start level of an application pulse voltage and a verification execution type number are retained. The verification execution time number from within the history information is obtained as status from the nonvolatile memory 301 or 302. On the other hand, the start level of the application pulse voltage is designated as a parameter for the nonvolatile memory 301 or 302.

[Operation of the Information Processing System]

Operation of the information processing system of the third embodiment of the present technology is similar to that of the first or second embodiment described hereinabove. In other words, the write command processing procedure of the storage controlling part 200 is similar to that described hereinabove with reference to FIG. 7.

Further, the logical page write processing procedure of the storage controlling part 200 is similar to that described hereinabove with reference to FIG. 17. However, when the history information management table 222 is updated at step S945, the "start level" of the program is updated to a value of a start level designated as a parameter when a program operation is executed. Similarly, the "start level" of erasure is updated to a value of a start level designated as a parameter when an erasure operation is executed. Further, similar operation is carried out also when the history information management table 222 is updated at step S948.

Further, the write processing procedure of the storage controlling part 200 is similar to that described hereinabove with reference to FIG. 9. However, when a search for a physical page which allows data writing of high reliability is carried out at step S952, a physical page with regard to which the start level upon program operation is comparatively low and the verification execution time number is comparatively small is searched for regarding the physical page as a physical page which has high reliability. Weighting is carried out for the history information such that importance is attached to recent execution results so that they have a comparatively high influence on the search results. In the following, description is given using an example illustrated in FIGS. 19 and 20.

The processor 210 searches the physical pages in order beginning with the physical page address "0x00000000" to search for a physical page wherein the state is "blank" and the value X4 calculated in accordance with an expression given below is lowest:

$X4=\{$(verification execution time number upon program operation one cycle before)+(start level upon program operation one cycle before)$\}\times 3+$
$\{$(verification execution time number upon program operation two cycles before)+(start level upon program operation two cycles before)$\}\times 2+$
$\{$(verification execution time number upon program operation three cycles before)+(start level upon program operation three cycles before)$\}\times 1.$ In the example illustrated in FIG. 19, when the physical page addresses wherein the state is "blank" are only "k+1," "k+2" and "k+3," the processor 210 selects the physical page address "k+2." Further, in the example illustrated in FIG. 20, if the physical page addresses of the nonvolatile memory 302 wherein the state is "blank" are only "j," "j+2" and "j+3," then the processor 210 selects the physical page address "j+2."

When a data write operation of high reliability is executed at step S953, the start level "1" is designated as the parameter.

On the other hand, when a search for a physical page which allows high speed data writing is carried out at step S955, a search for a physical page with regard to which the verification execution time number upon execution of a program operation is comparatively small is carried out regarding the physical page as a physical page which allows high speed data writing. Weighting is carried out for the history information such that importance is attached to recent execution results so that they have a comparatively high influence on the search results. The processor 210 searches the physical pages in order beginning with the physical page address "0x00000000" to search for a physical page wherein the state is "blank" and the value X2 described hereinabove is lowest. In the example illustrated in FIG. 19, if the physical page addresses in the nonvolatile memory 301 wherein the state is "blank" are only "k+1," "k+2" and "k+3," then the processor 210 selects the physical page address "k+1." Further, in the example illustrated in FIG. 20, if the physical page addresses of the nonvolatile memory 302 wherein the state is "blank" are only "j," "j+2" and "j+3," then the processor 210 selects the physical page address "j."

Further, when a data write operation of a high speed performance is executed at step S956, the value X5 calculated in accordance with an expression given below is designated as a start level as a parameter. This value X5 indicates a start level with which the verification execution time number is expected to be one based on a result of execution one cycle before.

$X5=$(verification execution time number upon program operation one cycle before)+(start level upon program operation one cycle before)$-1$ Further, at step S957, a search for a physical page which is less likely to hit in the search at step S952 or S955. The processor 210 searches the history information management table 222 in order beginning with the physical page address "0x00000000" to search for a physical page wherein the state is "blank" and the "verification execution time number upon program operation one cycle before" is 4. If no pertaining physical page is searched out, then the processor 210 searches for a physical page wherein the "verification execution time number upon program operation two cycles before" is "4" and a physical page wherein the "verification execution time number upon program operation three cycles before" is "4" in order. If such searches still result in failure, then a physical page wherein the "verification execution time number upon program operation one cycle before" is "3," a physical page wherein the "verification execution time number upon program operation two cycles before" is "3" and a physical page wherein the "verification execution time number upon program operation three cycles before" is "3" in order. In the example illustrated in FIG. 19, a physical page in the nonvolatile memory 301 whose physical page address is "k+3" is selected. Further, in the example illustrated in FIG. 20, if the physical page addresses of the nonvolatile memory 302 wherein the state is "blank" are only "j," "j+2" and "j+3," then the processor 210 selects the physical page address "j+2."

Further, when a data write operation is executed at step S958, a start level "1" is designated as a parameter in the case in which none of high reliability and a high speed performance is required.

Further, when an erasure operation is executed at step S959, the "start level" to be designated by the processor 210 is designated in accordance with the following condition according to a program operation immediately prior to the erasure operation. In particular, in the erasure operation after the program operation at step S953, the "start level" is designated as "1." In the erasure operation after the program operation at step S956, the value X6 calculated in accordance with an expression given below is designated as the start level. This value X6 indicates a start level with which the verification execution time number after the erasure operation is expected to end in short time.

$$X6 = \text{(verification execution time number upon erasure operation one cycle before)} + \text{(start level upon erasure operation one cycle before)} - 1$$

In the execution operation after the program operation at step S958, the "start level" is designated as "1."

Figure 21:
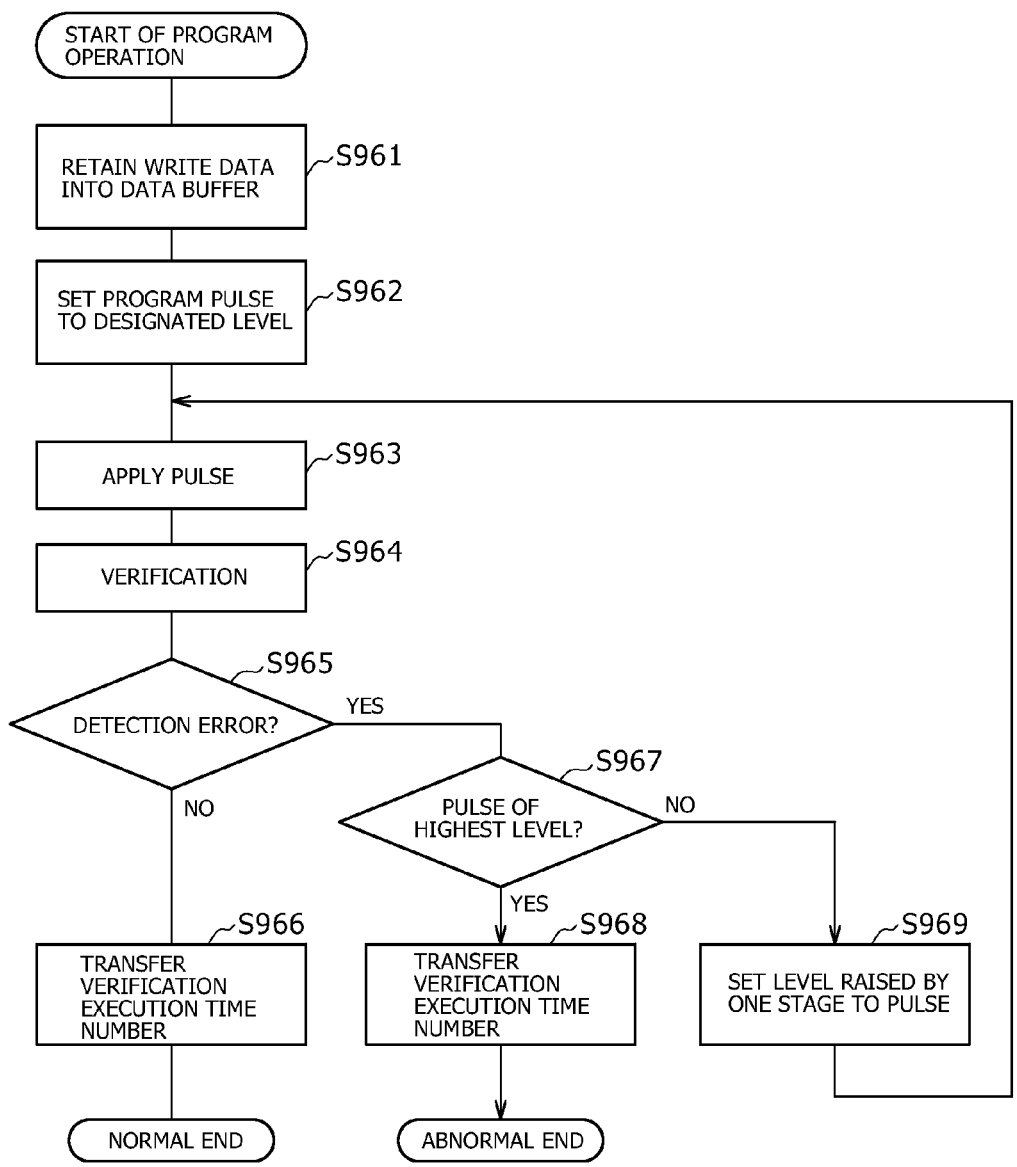
FIG. 21 is a flow chart illustrating an example of a processing procedure of a program operation of the nonvolatile memories shown in FIG. 18.

FIG. 21 illustrates an example of a processing procedure of a program operation of the nonvolatile memory 300 in the third embodiment of the present disclosure, namely, of the operation at steps S953, S956 and S958. Referring to FIG. 21, the nonvolatile memory 300 starts a program operation when the controlling interface 309 receives an instruction for a program operation from the storage controlling part 200. Upon starting of the program operation, the number retained in the verification time number counter 340 is in an initialized state to "0."

Into the data buffer 320, write data received by the controlling interface 309 is retained at step S961. Further, into the voltage level counter 380, a start level of an application pulse voltage received as a parameter by the controlling interface 309 is retained at step S962.

Then, a physical address received by the controlling interface 309 is transferred to the control section 390, and a pulse of the start level retained in the voltage level counter 380 is applied to the designated physical address of the memory array 310. Consequently, the write data retained in the data buffer 320 is written into the designated address of the memory array 310 at step S963. In order to verify whether or not the write data has been written with certainty, data is read out from the physical address and is compared with the write data retained in the data buffer 320 by the verification section 330 at step S964. Further, the verification time number of the verification time number counter 340 is incremented by one.

If the verification success decision section 350 decides a result of the verification of the verification section 330 and finds no detection error at step S965, namely, if the decision at step S965 is No, then the processing ends normally. In this instance, the verification time number retained in the verification time number counter 340 is transferred as status to the storage controlling part 200 at step S966.

On the other hand, if a detection error is found at step S965, namely, if the decision at step S965 is Yes, then it is decided at step S956 whether or not the voltage level applied thereupon is "4" which represents the highest level at step S967. If the applied voltage is not the highest level at step S967, namely, if the decision at step S967 is No, then the level of the voltage level counter 380 is set to a level higher by one stage at step S969, and then the processing procedure beginning with step S963 is repeated. On the other hand, if the applied voltage is the highest level at step S967, namely, if the decision at step S967 is Yes, then the processing ends but abnormally. In this instance, the verification time number retained in the verification time number counter 340 is transferred as status to the storage controlling part 200 at step S968.

Figure 22:
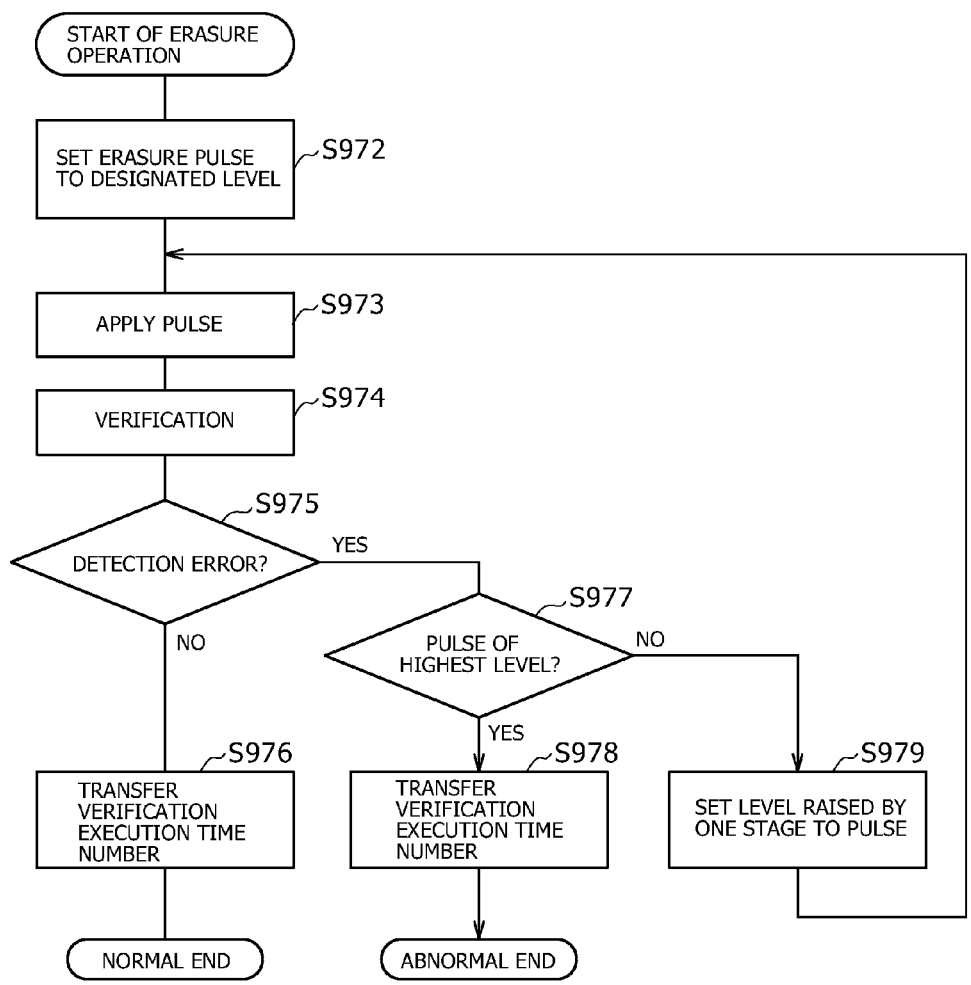
FIG. 22 is a flow chart illustrating an example of a processing procedure of an erasure operation of the nonvolatile memories shown in FIG. 18.

FIG. 22 illustrates an example of a processing procedure of an erasure operation of the nonvolatile memory 300 in the third embodiment of the present technology, namely, the operation at step S959 in FIG. 9. Referring to FIG. 22, the nonvolatile memory 300 starts an erasure operation when an instruction for an erasure operation from the storage controlling part 200 is received by the controlling interface 309. Upon starting of the erasure operation, the number retained in the verification time number counter 340 is in an initialized state to "0."

Into the voltage level counter 380, a start level of an application pulse voltage received as a parameter by the controlling interface 309 is retained at step S972.

Then, a physical address received by the controlling interface 309 is transferred to the control section 390, and a pulse of the start level retained in the voltage level counter 380 is applied to the designated physical address of the memory array 310 at step S973. Consequently, an erasure operation is carried out. In order to verify whether or not the erasure operation has been carried out with certainty, data is read out from the physical page address and is compared with data expected as data after the erasure, for example, with data of all bits of "1," by the verification section 330 at step S974. Further, the verification time number of the verification time number counter 340 is incremented by one.

If the verification success decision section 350 decides a result of the verification of the verification section 330 and finds no detection error at step S975, namely, if the decision at step S975 is No, then the processing ends normally. In this instance, the verification time number retained in the verification time number counter 340 is transferred as status to the storage controlling part 200 at step S976.

On the other hand, if it is decided at step S975 that a detection error is found, namely, if the decision at step S975 is Yes, then it is decided whether or not the voltage level applied thereupon is "4" which indicates the highest level at step S977. If the applied voltage level is not the highest level at step S977, namely, if the decision at step S977 is No, then the level of the voltage level counter 380 is set to a level higher by one stage at step S979, and then the processing procedure at the steps beginning with step S973 is repeated. On the other hand, if the applied voltage level is the highest level at step S977, namely, if the decision at step S977 is Yes, then the processing ends but abnormally. In this instance, the verification time number retained in the verification time number counter 340 is transferred as status to the storage controlling part 200 at step S978.

In this manner, with the third embodiment of the present disclosure, a physical page of an object of a write process can be selected so as to satisfy a condition for high reliability or a high speed performance based on history information including a start level of an application voltage to a ReRAM. Further, when a start level of the application voltage is designated as a parameter for a write process, history information in verification upon a program operation and erasure can be used. For example, as a parameter in the case where a high speed performance in a program operation is required, a start level with which it is expected that the verification execution time number after the erasure operation can be ended in short time can be designated.

It is to be noted that the embodiments described hereinabove indicate mere examples for carrying out the present technology, and items described in connection with the embodiments and features described in the claims have a corresponding relationship to each other. Similarly, the features described in the claims and items in the embodiments of the present technology denoted by like names individually have a corresponding relationship to each other. However, the present technology is not restricted to the embodiments but can be carried out by applying various modifications or alterations to the embodiments without departing from the subject matter of the present technology.

Further, the processing procedures described hereinabove in the description of the embodiments may be grasped as a method having any of the procedures or may be grasped as a program for causing a computer to execute the procedures or a recording medium which stores the program. As the recording medium, for example, a CD (Compact Disc), an MD (Mini Disc), a DVD (Digital Versatile Disk), a memory card, or a blue ray disk (Blu-ray Disc: registered trademark) can be used.

It is to be noted that the present technology can take such configurations as described below.

(1) A storage controlling apparatus, including:
a status acquisition section configured to acquire status including a number of times of execution of verification after writing into a memory from the memory;
a history information retention section configured to retain a history of the status as history information in an associated relationship with each of predetermined regions of the memory; and
a region selection section configured to select a region which satisfies a condition in accordance with the history information when a new region is to be used in the memory.

(2) The storage controlling apparatus according to (1) above, wherein the region selection section selects, in the case where a high speed performance is required as the condition, a region based on the number of times of execution of the verification in the history information.

(3) The storage controlling apparatus according to (1) or (2) above, wherein the region selection section selects, in the case where a high speed performance is required as the condition, a region with regard to which the number of times of execution of the verification is comparatively small in the history information.

(4) The storage controlling apparatus according to any one of (1) to (3) above, wherein
the status acquisition section receives a number of errors detected in the verification as the status, and
the region selection section selects, in the case where high reliability is required as the condition, a region based on the detected number of errors in the history information.

(5) The storage controlling apparatus according to (4) above, wherein the region selection section selects,
where high reliability is required as the condition, a region in which the detected number of errors is comparatively small in the history information.

(6) The storage controlling apparatus according to any one of (1) to (5) above, further including
a parameter designation section configured to designate a parameter in accordance with the history information when writing into the memory is to be carried out newly.

(7) The storage controlling apparatus according to (6) above, wherein the parameter designation section designates a number of errors permissible in verification after writing as the parameter.

(8) The storage controlling apparatus according to (7) above, wherein
the status acquisition section receives the number of errors detected in the verification as the status, and
the parameter designation section designates, as the parameter, the number of permissible errors in accordance with the detected number of errors included in the history information.

(9) The storage controlling apparatus according to (6) above, wherein the parameter designation section designates, as the parameter, an initial value of a voltage level of a pulse to be applied in the memory upon writing.

(10) The storage controlling apparatus according to (9) above, wherein
the history information retention section retains, as the history information, the initial value of the voltage level designated as the parameter, and the parameter designation section designates, as the parameter, an initial value of a voltage level of a pulse to be applied in the memory upon new writing in accordance with the initial value of the voltage level included in the history information.

(11) A storage apparatus, including:
a memory array;
a verification section configured to execute verification after writing into the memory array;
a verification time number counter configured to count a number of times of execution of the verification;
a status acquisition section configured to acquire status including the number of times of execution of the verification;
a history information retention section configured to retain a history of the status as history information in an associated relationship with each of the predetermined regions of the memory array; and
a region selection section configured to select a region which satisfies a condition in accordance with the history information when a new region is to be used in the memory array.

(12) The storage apparatus according to (11) above, further including
a detection error number counter configured to count a number of errors detected in the verification, wherein
the status acquisition section receives the number of errors detected as the status, and
the region selection section selects, where high reliability is required as the condition, a region in which the detected number of errors is comparatively small in the history information.

(13) An information processing system, including:
a memory array;
a verification section configured to execute verification after writing into the memory array;
a verification time number counter configured to count a number of times of execution of the verification;
a status acquisition section configured to acquire status including the number of times of execution of the verification;
a history information retention section configured to retain a history of the status as history information in an associated relationship with each of the predetermined regions of the memory array;
a region selection section configured to select a region which satisfies a condition in accordance with the history information when a new region is to be used in the memory array; and
a host computer configured to issue a write command to the memory array.

(14) A storage controlling method, including:
acquiring status including a number of times of execution of verification after writing into a memory from the memory;
retaining a history of the status as history information into a history information retention section in an associated relationship with each of predetermined regions of the memory; and
selecting a region which satisfies a condition in accordance with the history information when a new region is to be used in the memory.

The present disclosure contains subject matter related to that disclosed in Japanese Priority Patent Application JP 2012-093521 filed in the Japan Patent Office on Apr. 17, 2012, the entire content of which is hereby incorporated by reference.

What is claimed is:

1. A storage controlling apparatus, comprising:
a status acquisition section configured to acquire status including a number of times of execution of verification after writing data into a memory from the memory;
a history information retention section configured to retain a history of the status as history information in an associated relationship with each of predetermined regions of the memory; and
a region selection section configured to select a region, based on the number of times of execution of the verification after writing data in the region in the history information, when a new region is to be used in the memory.

2. The storage controlling apparatus according to claim 1, wherein the region selection section is configured to select a region with regard to which the number of times of execution of the verification is comparatively small in the history information.

3. The storage controlling apparatus according to claim 1, wherein
the status acquisition section is configured to receive a number of errors detected in the verification as the status, and
the region selection section is configured to select a region based on the detected number of errors in the history information.

4. The storage controlling apparatus according to claim 3, wherein the region selection section is configured to select a region in which the detected number of errors is comparatively small in the history information.

5. The storage controlling apparatus according to claim 1, further comprising a parameter designation section configured to designate a parameter in accordance with the history information when writing into the memory is to be carried out newly.

6. The storage controlling apparatus according to claim 5, wherein the parameter designation section is configured to designate a number of errors, permissible in the verification after writing, as the parameter.

7. The storage controlling apparatus according to claim 6, wherein
the status acquisition section is configured to receive the number of errors detected in the verification as the status, and
the parameter designation section is configured to designate, as the parameter, the number of permissible errors in accordance with the detected number of errors included in the history information.

8. The storage controlling apparatus according to claim 5, wherein the parameter designation section is configured to designate, as the parameter, a first initial value of a first voltage level of a first pulse to be applied in the memory upon writing.

9. The storage controlling apparatus according to claim 8, wherein
the history information retention section is configured to retain, as the history information, the first initial value of the first voltage level designated as the parameter, and
the parameter designation section is configured to designate, as the parameter, a second initial value of a second voltage level of a second pulse to be applied in the memory upon new writing in accordance with the first initial value of the first voltage level included in the history information.

10. A storage apparatus, comprising:
a memory array;
a verification section configured to execute verification after writing data into the memory array;
a verification time number counter configured to count a number of times of execution of the verification;
a status acquisition section configured to acquire status including the number of times of execution of the verification;
a history information retention section configured to retain a history of the status as history information in an associated relationship with each of the predetermined regions of the memory array; and
a region selection section configured to select a region, based on the number of times of execution of the verification after writing data in the region in the history information, when a new region is to be used in the memory array.

11. The storage apparatus according to claim 10, further comprising a detection error number counter configured to count a number of errors detected in the verification,
wherein the status acquisition section is configured to receive the number of errors detected as the status, and
the region selection section is configured to select a region in which the detected number of errors is comparatively small in the history information.

12. The storage apparatus according to claim 10, wherein the verification is executed to verify whether or not the data is written into the memory array with certainty.

13. The storage apparatus according to claim 10, further comprising a control section configured to write the data retained in a data buffer into the memory array.

14. The storage apparatus according to claim 13, wherein the verification section is configured to compare the data read out from the memory array and the data retained in the data buffer for verification.

15. An information processing system, comprising:
a memory array;
a verification section configured to execute verification after writing data into the memory array;
a verification time number counter configured to count a number of times of execution of the verification;
a status acquisition section configured to acquire status including the number of times of execution of the verification;
a history information retention section configured to retain a history of the status as history information in an associated relationship with each of the predetermined regions of the memory array;
a region selection section configured to select a region, based on the number of times of execution of the verification after writing data in the region in the history information, when a new region is to be used in the memory array; and
a host computer configured to issue a write command to the memory array.

16. A storage controlling method, comprising:
acquiring status including a number of times of execution of verification after writing data into a memory from the memory;
retaining a history of the status as history information into a history information retention section in an associated relationship with each of predetermined regions of the memory; and
selecting a region, based on the number of times of execution of the verification after writing data in the region in the history information, when a new region is to be used in the memory.

* * * * *